(12) United States Patent
Matsuki et al.

(10) Patent No.: US 7,478,267 B2
(45) Date of Patent: Jan. 13, 2009

(54) ACCESS CONTROL DEVICE AND INTERFACE INSTALLED IN SAME

(75) Inventors: Kunihito Matsuki, Odawara (JP); Yutaka Takata, Ninomiya (JP); Hiroshi Ogasawara, Odawara (JP); Naotaka Kobayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 487 days.

(21) Appl. No.: 11/105,430

(22) Filed: Apr. 14, 2005

(65) Prior Publication Data

US 2006/0184823 A1 Aug. 17, 2006

(30) Foreign Application Priority Data

Feb. 17, 2005 (JP) ............... 2005-040080

(51) Int. Cl.
*G06F 11/00* (2006.01)
(52) U.S. Cl. .......................... 714/5; 711/152
(58) Field of Classification Search ............. 714/5; 711/152
See application file for complete search history.

(56) References Cited

U.S. PATENT DOCUMENTS

| | | | | |
|---|---|---|---|---|
| 5,390,186 | A * | 2/1995 | Murata et al. ............... 711/113 |
| 5,611,069 | A * | 3/1997 | Matoba ....................... 711/114 |
| 5,636,341 | A * | 6/1997 | Matsushita et al. ............ 714/13 |
| 5,740,357 | A | 4/1998 | Gardiner et al. |
| 5,790,775 | A | 8/1998 | Marks et al. |
| 6,578,158 | B1 * | 6/2003 | Deitz et al. ................... 714/11 |
| 6,598,174 | B1 * | 7/2003 | Parks et al. .................... 714/6 |
| 6,701,449 | B1 * | 3/2004 | Davis et al. .................... 714/4 |
| 6,704,812 | B2 * | 3/2004 | Bakke et al. ................. 710/38 |
| 6,721,907 | B2 * | 4/2004 | Earl ............................ 714/57 |
| 6,732,243 | B2 * | 5/2004 | Busser et al. ............... 711/162 |
| 6,842,793 | B2 * | 1/2005 | Ohashi et al. .................. 710/5 |
| 6,851,020 | B2 | 2/2005 | Matsumoto et al. |
| 6,862,690 | B1 * | 3/2005 | Bezera et al. ................... 714/4 |
| 6,907,500 | B2 * | 6/2005 | Suzuki et al. ............... 711/114 |
| 7,065,670 | B2 * | 6/2006 | Gahan et al. ................... 714/4 |
| 7,089,451 | B2 * | 8/2006 | Ote et al. ...................... 714/31 |
| 7,266,638 | B2 * | 9/2007 | Coppock et al. ............ 711/114 |
| 7,305,520 | B2 * | 12/2007 | Voigt et al. .................. 711/112 |
| 7,313,717 | B2 * | 12/2007 | Vecoven et al. ................. 714/4 |
| 7,313,721 | B2 * | 12/2007 | Ashmore ....................... 714/7 |
| 7,340,642 | B1 * | 3/2008 | Coatney ........................ 714/7 |
| 7,363,531 | B2 * | 4/2008 | Vecoven ........................ 714/6 |

(Continued)

FOREIGN PATENT DOCUMENTS

JP 2002351703 12/2002

*Primary Examiner*—Robert Beausoliel
*Assistant Examiner*—Joshua P Lottich
(74) *Attorney, Agent, or Firm*—Mattingly, Stanger, Malur & Brundidge, P.C.

(57) ABSTRACT

The access control device comprises a first interface (IF) which receives access requests from a host device, and a second IF which respectively accesses one or a plurality of access destination candidates in an external device. The second IF attempts to access a particular access destination candidate if the first IF has received an access request, and outputs a judgment result indicating that a recovery has been performed if it is determined that a recovery has been performed after the access attempt has failed. The first IF detects whether there has been a recovery in the access path to the particular access destination candidate by referring to the judgment result output by the second IF.

10 Claims, 20 Drawing Sheets

U.S. PATENT DOCUMENTS

| | | |
|---|---|---|
| 7,401,260 B2 * | 7/2008 | Bomhoff et al. ............... 714/42 |
| 7,418,557 B2 * | 8/2008 | Blinick et al. ................ 711/141 |
| 2002/0091814 A1 * | 7/2002 | Arendt et al. ................ 709/223 |
| 2002/0120706 A1 * | 8/2002 | Murphy ...................... 709/208 |
| 2002/0156984 A1 * | 10/2002 | Padovano .................. 711/148 |
| 2002/0178143 A1 | 11/2002 | Fujimoto |
| 2003/0084100 A1 * | 5/2003 | Gahan et al. ................ 709/203 |
| 2003/0135782 A1 * | 7/2003 | Matsunami et al. ............ 714/5 |
| 2003/0159001 A1 * | 8/2003 | Chalmer et al. ............ 711/120 |
| 2003/0191992 A1 * | 10/2003 | Kaminsky et al. ........... 714/712 |
| 2003/0233498 A1 * | 12/2003 | Ogasawara et al. ........... 710/36 |
| 2004/0019740 A1 * | 1/2004 | Nakayama et al. .......... 711/113 |
| 2004/0049633 A1 * | 3/2004 | Suzuki et al. ............... 711/114 |
| 2004/0068561 A1 | 4/2004 | Yamamoto et al. |
| 2004/0103210 A1 * | 5/2004 | Fujii et al. .................. 709/239 |
| 2004/0128456 A1 | 7/2004 | Kobayashi et al. |
| 2004/0148329 A1 | 7/2004 | Ogasawara et al. |
| 2004/0153721 A1 * | 8/2004 | Fujimoto ........................ 714/5 |
| 2004/0193969 A1 * | 9/2004 | Nemoto et al. ............... 714/100 |
| 2004/0221193 A1 * | 11/2004 | Armstrong et al. ............ 714/10 |
| 2004/0221198 A1 * | 11/2004 | Vecoven ....................... 714/25 |
| 2005/0015647 A1 * | 1/2005 | Okada et al. .................... 714/5 |
| 2005/0015664 A1 * | 1/2005 | Johnson et al. ................ 714/15 |
| 2005/0076178 A1 * | 4/2005 | Coppock et al. ............ 711/114 |
| 2005/0091221 A1 * | 4/2005 | Harris et al. ............. 707/10 |
| 2005/0177764 A1 * | 8/2005 | Cassell et al. .................... 714/5 |
| 2005/0193132 A1 * | 9/2005 | O'Brien et al. ............. 709/229 |
| 2006/0013124 A1 * | 1/2006 | Fottak ........................ 370/216 |
| 2006/0047997 A1 * | 3/2006 | Anderson et al. ............. 714/4 |
| 2007/0089045 A1 * | 4/2007 | Corbett et al. .............. 714/801 |

* cited by examiner

FIG. 3

| VDEV | FAULT INFORMATION | EXTERNAL DEVICE INFORMATION ||||  Tm |
| | | DEVICE IDENTIFICATION INFORMATION | CAPACITY (KB) | DEVICE TYPE | PATH INFORMATION ||
| | | | | | WWN | LUN |
| 0 | NORMAL | DRFGTFNEIEK | 657,456 | DISK | 0xAABBCCDD | 0 |
| 1 | ERROR | ADRFGTFNEIE | 89,854 | DISK | 0xAABBEEFF | 3 |
| 2 | NORMAL | GGRRFFDDERT | — | TAPE | 0x445566AAB | 5 |
| 3 | ERROR | AABBCCDDEE | 5,544223 | DISK | 0x77DE12345 | 6 |
| | | | | | 0x77DE12345 | 3 |
| | | | | | 0x377DE7890 | 5 |

ALTERNATIVE PATHS (last three rows of path information)

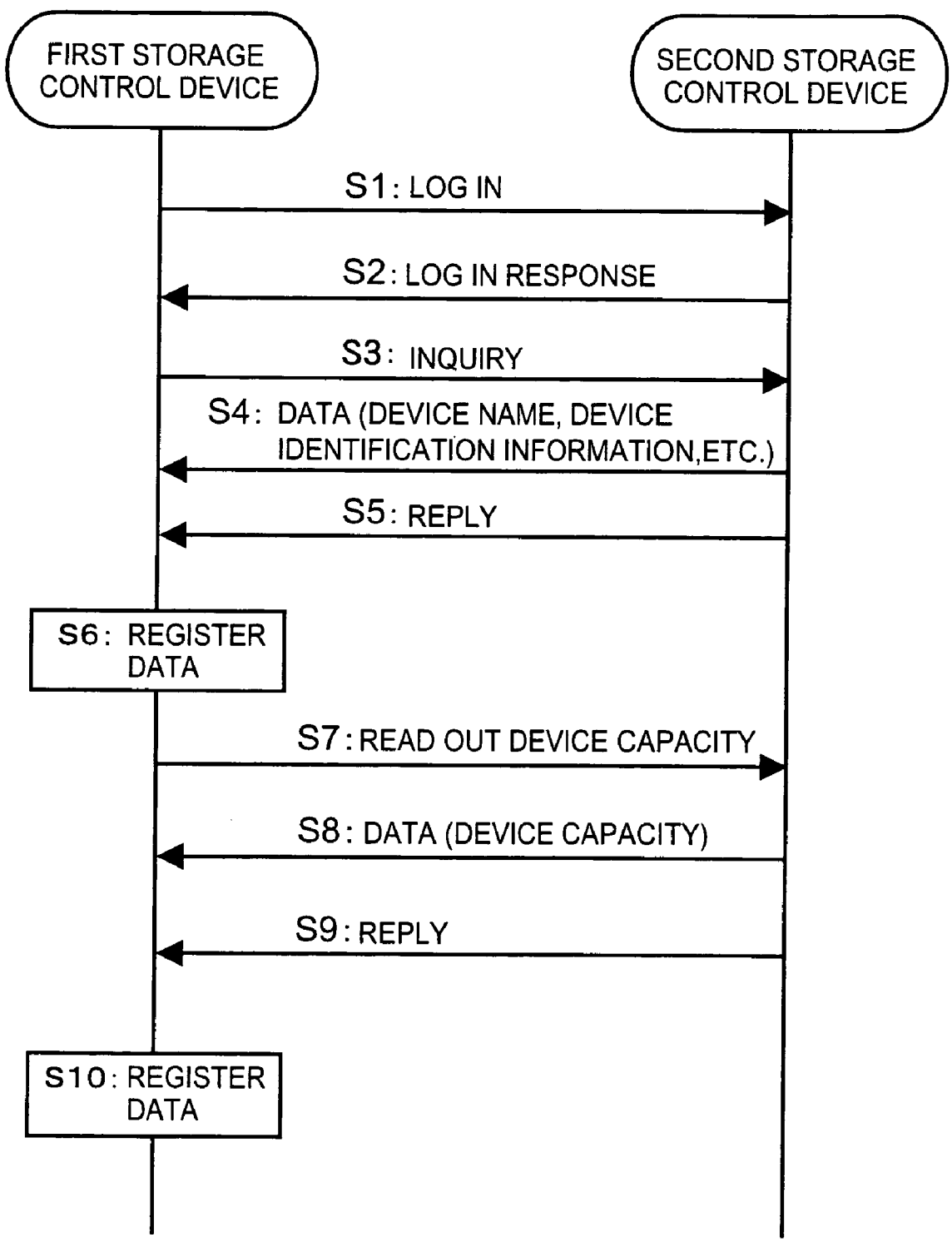

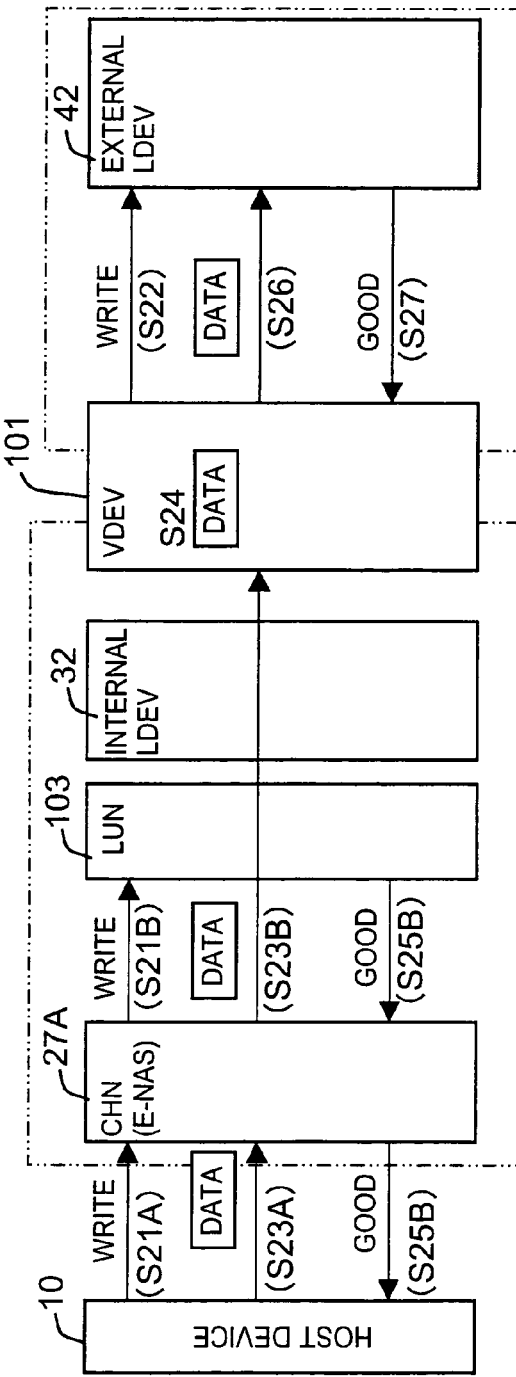
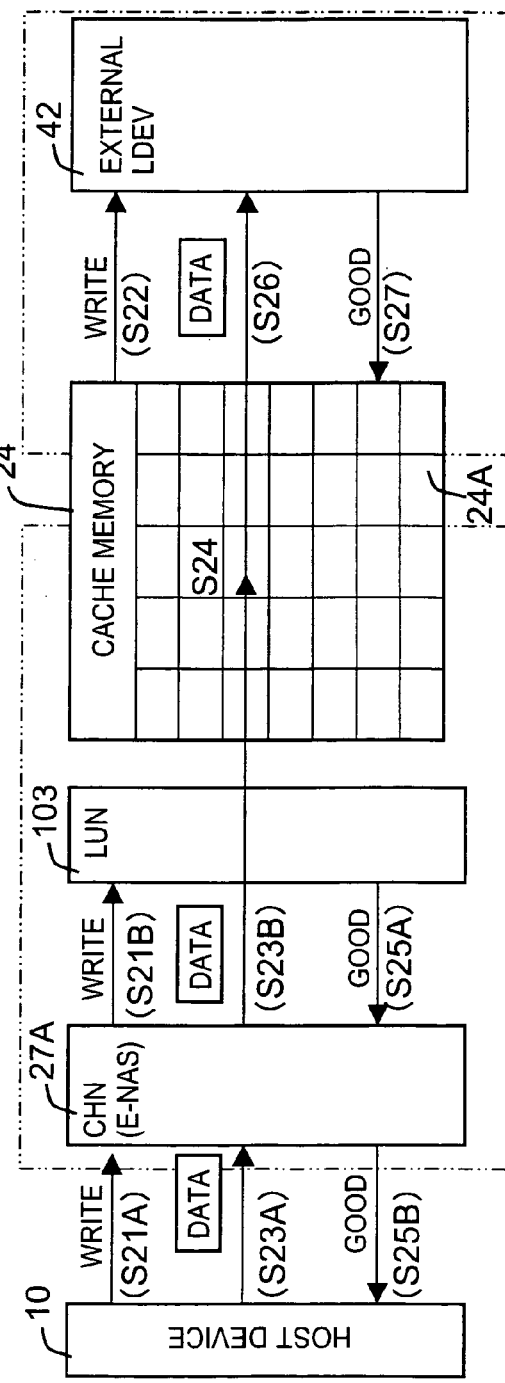

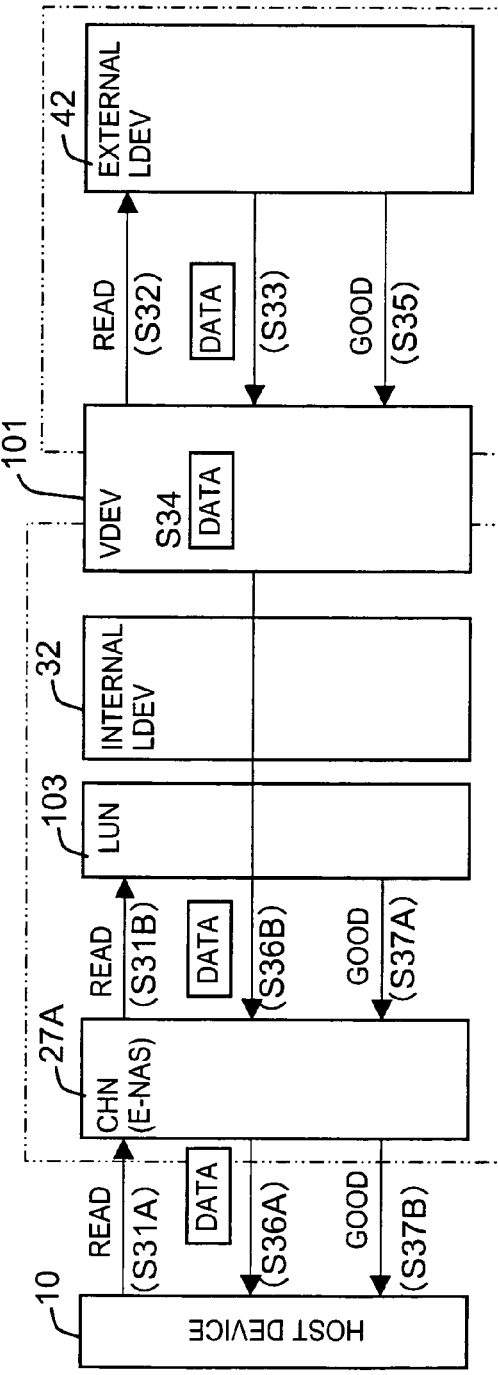
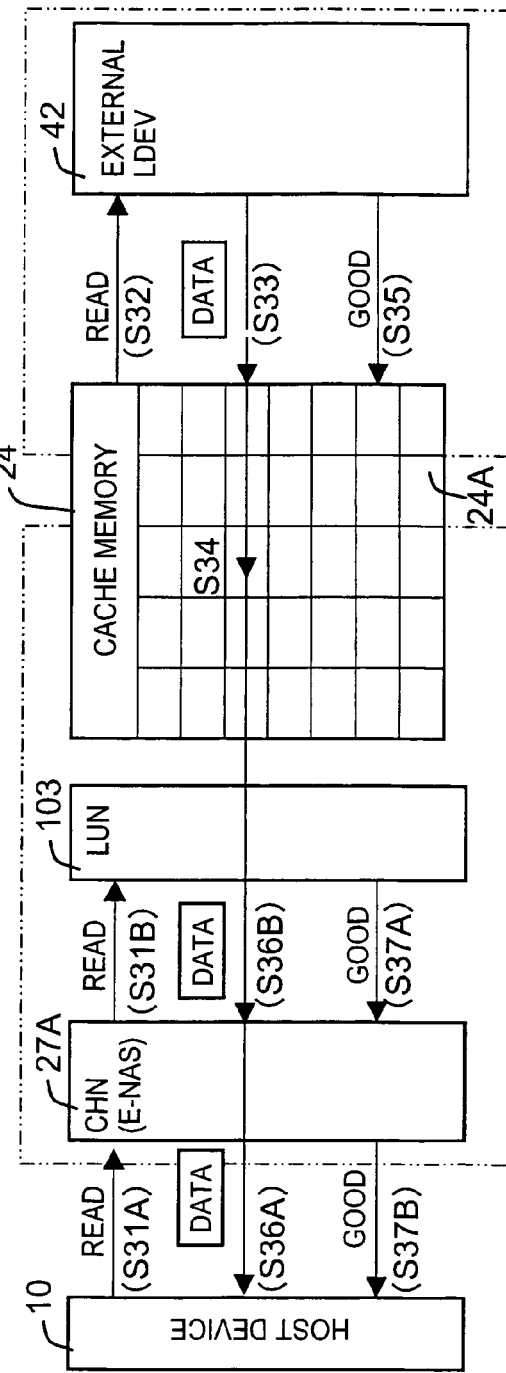
FIG. 7A
FIG. 7B

FIG. 9A

| WORD | 31 — 24 | 23 — 17 | 16 | 15 — 8 | 7 — 0 |
|---|---|---|---|---|---|
| 0 | DIAGNOSIS IMPLEMENTATION FLAG | (RESERVED) | | STARTUP DEVICE TYPE | |
| 1 | DRIVE NUMBER 1 | | | | DRIVE NUMBER 0 |
| 2 | TIMING INFORMATION | | | | |
| 3 | (RESERVED) | TEMPERATURE INFORMATION #2 | | COMMAND RETRY NO. | COMMAND TIMEOUT VALUE |
| 4 | TEMPERATURE INFORMATION #3 | | | TEMPERATURE INFORMATION #1 | TEMPERATURE INFORMATION #0 |

FIG. 9B

| WORD | 31 — 24 | 23 — 17 | 16 — 8 | 7 — 0 |
|---|---|---|---|---|
| 0 | MAC ADDRESS | | | |
| 1 | 0 PADDING REGION | | | |
| 2 | BIOS VERSION | | | |

FIG. 13A

| WORD | 31 | 30 | ... 533 ... | 1 | 0 |
|---|---|---|---|---|---|
| 1 | | | | | |
| 2 | | | | | |
| ... | | | | | |
| 7 | | | | | |
| 8 | | | | | |

FIG. 13B

| WORD | 31 | 30 | ... 531 ... | 1 | 0 |
|---|---|---|---|---|---|
| 1 | | | | | |
| 2 | | | | | |
| ... | | | | | |
| 7 | | | | | |
| 8 | | | | | |

FIG. 14

| SEQUENCE | NAS PROCESSOR 112 (CHN) | I/O PROCESSOR 119 (CHN) | I/O PROCESSOR 619 (CHA) | ACCESS PATH TO EXTERNAL LDEV |
|---|---|---|---|---|
| 1 | – | – | – | FAULT OCCURS (S101) |
| 2 | PERFORM BLOCKED OF LDEV, AND SET DOORBELL FOR I/O PROCESSOR (S103) | – | RECOGNIZE FAULT BY POLLING (S102) | – |
| 3 | – | – | UPDATE FAULT INFORMATION IN MAPPING TABLE Tm IN SHARED MEMORY (S104) | – |
| 4 | – | POLL MAPPING TABLE Tm AND IF THERE IS A FAULT RAISE FAULT BIT IN LDEV FAULT BITMAP (S105) | – | – |

FIG. 16

| SEQUENCE | NAS PROCESSOR 112 (CHN) | I/O PROCESSOR 119 (CHN) | I/O PROCESSOR 619 (CHA) | ACCESS PATH TO EXTERNAL LDEV |
|---|---|---|---|---|
| 1 | — | — | — | RECOVERY (S201) |
| 2 | — | — | RECOGNIZE RECOVERY BY POLLING(S202) | — |
| 3 | — | — | UPDATE FAULT INFORMATION IN MAPPING TABLE IN SHARED MEMORY (S203) | — |
| 4 | — | POLL MAPPING TABLE Tm AND RECOGNIZE RECOVERY (S204) | — | — |
| 5 | — | RAISE BIT CORRESPONDING TO RECOVERED LDEV IN LDEV RECOVERY BITMAP (S205) | — | — |
| 6 | (NAS PROCESSOR MAY POLL LDEV RECOVERY BITMAP RATHER THAN USING DOORBELL) | REPORT EXISTENCE OF RECOVERED LDEV TO NAS PROCESSOR BY MEANS OF DOORBELL FOR NAS PROCESSOR (S206) | — | — |
| 7 | — | LOWER FAULT BIT IN LDEV FAULT BITMAP (S207) | — | — |
| 8 | NAS PROCESSOR SETS RECOVERED LDEV BACK TO USABLE STATE (S208) | | | |
| 9 | LOWER BIT IN LDEV RECOVERY BITMAP (S209) | — | — | — |

FIG. 17

| SEQUENCE | CLUSTER 27 | | I/O PROCESSOR 619 (CHA) | ACCESS PATH TO EXTERNAL LDEV |
|---|---|---|---|---|
| | FIRST NAS PROCESSOR 112A | SECOND NAS PROCESSOR 112B | | |
| 1 | — | — | — | RECOVERY (S301) |
| 2 | — | — | RECOGNIZE RECOVERY BY POLLING AND REPORT TO CHN 27A (S302) | — |
| 3 | FAILOVER OF RESOURCES (S303) | — | — | — |
| 4 | STOP RESOURCE GROUP (S304) | — | — | — |
| 5 | RESTART (S305) | — | — | — |
| 6 | — | FAILBACK TO FIRST NAS PROCESSOR (S306) | — | — |
| 7 | START RESOURCE GROUP (S307) | — | — | — |

FIG. 19

| SEQUENCE | CLUSTER 27 | | I/O PROCESSOR 619 (CHA21A) | ACCESS PATH TO EXTERNAL LDEV |
|---|---|---|---|---|
| | FIRST NAS PROCESSOR 112A | SECOND NAS PROCESSOR 112B | | |
| 0 | BLOCKED ALL LDEVS AND GENERATE FAILOVER TO SECOND NAS PROCESSOR (S401) | — | — | — |
| 1 | — | — | | RECOVERY (S402) |
| 2 | — | — | RECOGNIZE RECOVERY BY POLLING AND REPORT TO CHNS 27A AND 27B (S403) | — |
| 3 | FORCE STOP OF RESOURCE GROUP (S404) | — | — | — |
| 4 | RESTART (S405) | — | — | — |
| 5 | — | FAILBACK TO FIRST NAS PROCESSOR (S406) | — | — |
| 6 | START RESOURCE GROUP (S407) | — | — | — |

FIG. 20

| SEQUENCE | CLUSTER 27 | | I/O PROCESSOR 619 (CHA21A) | ACCESS PATH TO EXTERNAL LDEV |
|---|---|---|---|---|
| | FIRST NAS PROCESSOR 112A | SECOND NAS PROCESSOR 112B | | |
| 0 | BLOCKED ALL LDEVS AND GENERATE FAILOVER TO FIRST NAS PROCESSOR (S501A) | BLOCKED ALL LDEVS AND GENERATE FAILOVER TO SECOND NAS PROCESSOR (S501B) | — | — |
| 1 | — | — | — | RECOVERY (S502) |
| 2 | — | — | RECOGNIZE RECOVERY BY POLLING AND REPORT TO CHNS 21A AND 21B (S503) | — |
| 3 | FORCE STOP OF RESOURCE GROUP (S504A) | FORCE STOP OF RESOURCE GROUP (S504B) | — | — |
| 4 | STOP CLUSTER (S505) | | — | — |
| 5 | RESTART (S506A) | RESTART (S506B) | — | — |
| 6 | START CLUSTER (S507) | | — | — |
| 7 | START RESOURCE GROUP (S508A) | START RESOURCE GROUP (S508B) | — | — |

ACCESS CONTROL DEVICE AND INTERFACE INSTALLED IN SAME

CROSS-REFERENCE TO PRIOR APPLICATION

This application relates to and claims priority from Japanese Patent Application No. 2005-40080, filed on Feb. 17, 2005 the entire disclosure of which is incorporated herein by reference.

BACKGROUND OF THE INVENTION

1. Field of the Invention

The present invention relates to the control of access to data, and more particularly, to technology for detecting recovery from a failure after it has been judged that the failure has occurred due to the fact an access control device has been unable to access another access control device, for example.

2. Description of the Related Art

For example, one type of access control device is a storage control device provided with a storage device. A storage control device can be connected in a communicable fashion with a host device which transmits data and with another storage control device provided with other storage devices. The storage control device receives data from the host device and writes the received data to a storage device, and by transmitting this data to the other storage control device, it is also able to write the data to the other storage device (see, for example, Japanese Patent Application Publication No. 2002-351703).

SUMMARY OF THE INVENTION

Here, if the storage control device is not able to access the other storage device of the other storage control device, then it can determine that a fault has occurred. If the device has been recovered from the fault, after it has been determined that a fault has occurred, then desirably, it should be possible to determine that recovery has been performed by a method other than a human operator inputting information to indicate that recovery has been achieved.

This can also be considered to apply similarly to other types of access control devices, and not only storage control devices.

Therefore, one object of the present invention is to make it possible to detect recovery from a fault after it has been judged that a fault has occurred due to one access control device not being able to access an external device other than the host device, by means of a detection method other than one based on information input by a human operator.

Other objects of the present invention will become apparent from the following description.

The access control device according to a first aspect of the present invention comprises: a first interface (for example, circuit board) receiving an access request from a host device issuing the access request; and a second interface (for example, a circuit board) for respectively accessing one or a plurality of access destination candidates in an external device provided with the one or a plurality of access destination candidates. When the first interface has received an access request, the second interface attempts access to a particular access destination candidate corresponding to the received access request, of the one or a plurality of access destination candidates. The second interface judges that a fault has occurred and outputs a judgment result indicating a fault, if the access attempt fails; and outputs a judgment result indicating a recovery if it is judged that there has been a recovery after the access attempt has failed. The first interface determines that there has been a recovery in the access path to the particular access destination candidate by referring to the judgment result output by the second interface.

In one mode of implementation, the access control device may further comprise a shared storage region which can be referred to by the first interface and the second interface. The shared storage region may store one or a plurality of status data corresponding respectively to the one or a plurality of access destination candidates. The second interface may update the status data corresponding to the particular access destination candidate to a status indicating that there is a fault, if it has been judged that there has been a fault, and update the status data to a status indicating that there is no fault or that there has been a recovery corresponding to the particular access destination candidate, if it has been judged that there has been a recovery. The first interface may determine that there has been a recovery in the access path to the particular access candidate by referring to the shared storage region at regular or irregular intervals.

One mode of implementation may comprise: a first processor which receives the access request from the host device and outputs another access request based on the received access request; and a second processor which receives the other access request output by the first processor, and outputs yet another access request in order to request the second interface to access the particular access destination candidate of the one or a plurality of access destination candidates, on the basis of the received other access request. The second processor may refer to the judgment result and output a reference result indicating the result of this reference.

In one mode of implementation, the first interface may have a first storage region which stores fault existence data indicating the existence or absence of a fault in the access path to each of the one or a plurality of access destination candidates. The second processor may set the existence of a fault in the fault existence data relating to the particular access destination candidate having a fault, and determine the existence of a fault and recognizes the particular access destination candidate corresponding to the existence of the fault, by referring to the fault existence data.

In one mode of implementation, the first processor may set a first interrupt relating to the second processor, when it has determined that there has been a fault in the access path to the particular access destination candidate on the basis of the reference result output by the second processor. The second processor may detect the first interrupt and set the existence of a fault in the fault existence data in response thereto.

In one mode of implementation, the first interface may have a second storage region which stores recovery existence data indicating the existence or absence of a recovery in the access path to each of the one or a plurality of access destination candidates. The second processor may set the existence of a recovery in the recovery existence data relating to the particular access destination candidate having a recovery. The first processor may determine the existence of a recovery and recognize the particular access destination candidate corresponding to the existence of a recovery, by referring to the recovery existence data.

In one mode of implementation, the second processor may set a second interrupt relating to the first processor, when it has determined that there has been a recovery from the judgment result. The first processor may detect the second interrupt and refer to the recovery existence data in response thereto.

In one mode of implementation, the first interface may have a first storage region which stores fault existence data indicating the existence or absence of a fault in the access path to each of the one or a plurality of access destination candidates; and a second storage region which stores recovery existence data indicating the existence or absence of a recovery in the access path to each of the one or a plurality of access destination candidates. The first processor may set a first interrupt relating to the second processor, when it has determined that there has been a fault in the access path to the particular access destination candidate on the basis of the reference result output by the second processor. The second processor may detect the first interrupt and in response thereto, set the existence of a fault in the fault existence data relating to the particular access destination candidate having a fault. The second processor may set the existence of a recovery in the recovery existence data relating to the particular access destination candidate having a recovery, if it has determined that there has been a recovery from the judgment result; set a second interrupt relating to the first processor; and change the existence of a fault in the fault existence data to an absence of a fault. The first processor may detect the second interrupt and in response thereto, determine the existence of a recovery by referring to the recovery existence data, recognize the particular access destination candidate corresponding to the existence of a recovery, and change the existence of a recovery thus determined to an absence of a recovery.

In one mode of implementation, a cluster may be formed by one first interface and another first interface. When there has been a fault in the access path to the particular access destination candidate, one first processor provided in the one first interface may set of the particular access destination candidate to blocked status (i.e., to set it as a non-accessible particular access destination candidate, store identification information for the particular access destination candidate that has been set to blocked status, and when there has subsequently been a recovery, implement a failover to another first processor provided in the other first interface and restart. Furthermore, upon the restart, the one first processor may erase the identification information for the access destination candidate that has been set to blocked status, and recognize a usable access destination candidate by receiving information relating to the one or a plurality of access destination candidates from the second processor.

In one mode of implementation, the first processor may receive a file-level access request from the host device, and convert the received file-level access request to a block-level access request and outputs same. The second processor may generate and output the other access request on the basis of the block-level access request output from the first processor.

In one mode of implementation, there may be provided: at least one or more logical units which are accessed by the host device; and at least one or more intermediate storage layers provided so as to connect the logical units to at least one or more storage devices. The one or a plurality of access destination candidates may be respectively storage devices. At least one of the intermediate storage layers may be connected to a storage device of the external device.

In one mode of implementation, the intermediate storage layers may comprise at least one or more first storage layers established on the storage device; and at least one or more second storage layers established on this first storage layer. A storage device of the external device is mapped to the first storage layer.

The interface according to a second aspect of the present invention is a first interface in an access control device comprising the first interface for receiving an access request from a host device issuing the access request, and a second interface for respectively accessing one or a plurality of access destination candidates in an external device provided with the one or a plurality of access destination candidates. This interface comprises: a first processor which receives the access request from the host device and outputs another access request based on the received access request; and a second processor which receives the other access request output by the first processor, and outputs yet another access request in order to request the second interface to access a particular access destination candidate of the one or a plurality of access destination candidates, on the basis of the received other access request; a first storage region which stores fault existence data indicating the existence or absence of a fault in the access path to each of the one or a plurality of access destination candidates; and a second storage region which stores recovery existence data indicating the existence or absence of a recovery in the access path to each of the one or a plurality of access destination candidates. If there is a fault in the access path from the second interface to the particular access destination candidate, the second processor sets the existence of a fault in the fault existence data for the particular access destination candidate having a fault, and when there has subsequently been a recovery, sets the existence of a recovery in the recovery existence data relating to the particular access destination candidate having a recovery, and changes the existence of a fault in the fault existence data to the absence of a fault. The first processor determines the existence of a recovery and recognizes the particular access destination candidate corresponding to the existence of a recovery, by referring to the recovery existence data; and changes the determined existence of a recovery to the absence of a recovery.

Here, the first processor may set a first interrupt relating to the second processor, when it has determined that there has been a fault in the access path to the particular access destination candidate. The second processor may detect the first interrupt and in response thereto, sets the existence of a fault in the fault existence data relating to the particular access destination candidate having a fault. The second processor may sets a second interrupt relating to the first processor, when it has determined that there has been a recovery. The first processor may detect the second interrupt and refers to the recovery existence data in response thereto.

The interface according to a third aspect of the present invention is a first interface (in particular, the "one first interface" described below) in an access control device comprising the first interface for receiving an access request from a host device issuing the access request, and a second interface for respectively accessing one or a plurality of access destination candidates in an external device provided with the one or a plurality of access destination candidates. This interface comprises: a first processor which receives the access request from the host device and outputs another access request based on the received access request; and a second processor which receives the other access request output by the first processor, and outputs yet another access request in order to request the second interface to access a particular access destination candidate of the one or a plurality of access destination candidates, on the basis of the received other access request. In the access control device, a cluster is formed by one first interface and another first interface. When there has been a fault in the access path from the second interface to the particular access destination candidate, one first processor provided in the one first interface sets the particular access destination candidate to be blocked status, stores identification information for the particular access destination candidate that has been set to blocked status, and when there has subsequently been a recovery, implements a failover to another first processor provided in the other first interface and restarts. Furthermore, upon the restart, the one first processor erases the identification information for the access destination candidate that has been set to blocked status, and recognizes a usable access destination candidate by receiving information relating to the one or a plurality of access destination candidates, from the second processor.

The storage device and storage regions described above may be physical storage resources, or they may be logical storage resource which are provided on a physical storage resource. Physical storage resources may be, for example, a hard disk, a magnetic disk, an optical disk, magnetic tape, or a semiconductor memory. A logical storage resource may be a logical volume.

BRIEF DESCRIPTION OF THE DRAWINGS

FIG. 3 shows an example of the composition of a mapping table Tm;

FIG. 4 is a time chart showing the principal parts of the processing carried out between the first storage control device 20 and the second storage control device 40 during a mapping operation;

FIG. 5 is a schematic diagram showing processing in the case of data writing; FIG. 5A is a flow diagram which is centered on illustrating the storage layers, and FIG. 5B is a flow diagram which is centered on illustrating the method of using the cache memory 24;

FIG. 6 is an illustrative diagram showing the sequence of processing in FIG. 5, in relation to the respective tables; FIG. 6C shows an example of the composition of another second conversion table T2a;

FIG. 7 is a schematic diagram showing processing in the case of data reading; FIG. 7A is a flow diagram which is centered on illustrating the storage layers, and FIG. 7B is a flow diagram which is centered on illustrating the method of using the cache memory 24;

FIG. 9A shows an example of the structure of the data stored in the data region 802A, FIG. 9B shows an example of the structure of the data stored in the data region 802B;

FIG. 11 shows an example of faults occurring in the access path to an external LDEV.

FIG. 13A shows an example of the composition of an LDEV fault bitmap 533; FIG. 13B shows an example of the composition of an LDEV recovery bitmap 531;

FIG. 14 shows the processing sequence carried out in a case where a fault has occurred in the access path to the external LDEV;

FIG. 16 shows the processing sequence carried out in a case where a fault has occurred in the access path to the external LDEV;

FIG. 17 is an illustrative diagram of a first example of a case where an LDEV having a recovery is detected by restarting the NAS processor, in a second embodiment of the present invention;

FIG. 19 is an illustrative diagram of a second example of a case where an LDEV having a recovery is detected by restarting the NAS processor, in a second embodiment of the present invention; and FIG. 20 is an illustrative diagram of a third example of a case where an LDEV having a recovery is detected by restarting the NAS processor, in a second embodiment of the present invention.

DESCRIPTION OF THE PREFERRED EMBODIMENTS

Below, one mode of implementing the present invention is described with respect to the drawings.

First Embodiment

Figure 1:
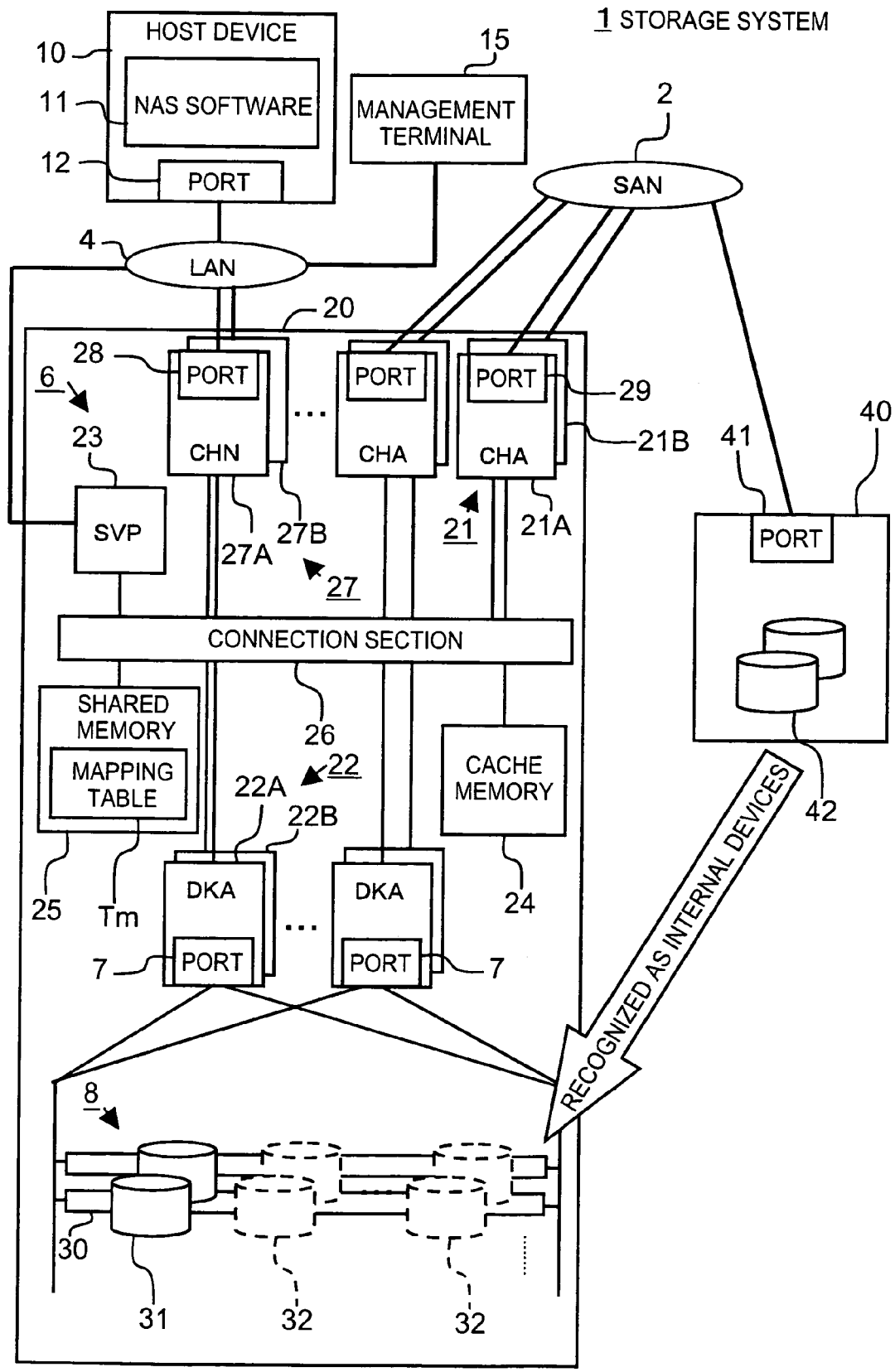
FIG. 1 is a block diagram showing a storage system according to a first embodiment of the present invention.

FIG. 1 is a block diagram showing a storage system according to a first embodiment of the present invention.

The host device 10, for example, is a computer device provided with information processing resources, such as a CPU (Central Processing Unit), memory, and the like, and it is constituted in the form of a personal computer, workstation, main frame computer, or the like. The host terminal 10 comprises, for example, information input devices (not illustrated), such as keyboard switches, a pointing device, microphone, or the like, and information output devices (not illustrated), such as a monitor display, speakers, and the like, for example. Moreover, the host device 10 is provided with NAS software 11 which uses a storage region belonging to a first storage control device 20 which is able to provide NAS (Network Attached Storage) services, and a port 12 for accessing the first storage control device 20 via a first communications network, such as a LAN (Local Area Network) 4, (for example, a port provided in a LAN-compatible network card). The host terminal 10 is able to request data input and output in file units by specifying a file name. The first communications network is not limited to a LAN and may be any type of communications network, provided that it allow data to be transferred at file level. Furthermore, the host device 10 may also be connected to the SAN (Storage Area Network) 2, which is described below. The host device 10 is able to send write requests and data for writing, and it is also able to send read requests for data to be read out. The NAS software 11 uses NFS (Network File System) if the operating system (OS) (not illustrated) of the host device 10 is UNIX (registered trade name), and it uses CIFS (Common Interface File System), if the OS is Windows (registered trade name).

The first storage control device 20 may be constituted as a disk array device comprising a plurality of disk type storage devices 30, for example. However, the first storage control device 20 is not limited to this, and it may also be constituted by an intelligent-type fiber channel switch providing high functionality. As described below, the first storage control device 20 provides the storage resources of a second storage control device 40, to the host device 10, as its own logical devices (hereinafter, abbreviated to "LDEV"), and therefore the first storage control device 20 does not need to have local storage devices which it controls directly. Furthermore, information, such as the OS (operating system) that is read into the processors of the respective adapters 27A, 21A, for example, may be stored in the disk type storage device 30 inside the first storage control device 20 (in other words, in an LDEV), and the processors may read in information on the OS, and the like, from that disk type storage device 30.

The first storage control device 20 may be divided broadly into a controller section 6 and a storage device section 8.

The storage device section 8 comprises a plurality of disk type storage devices 30. Each disk type storage device 30 is provided with one or a plurality of LDEVs 31. Similarly, the second storage control device 40 is also provided with one or a plurality of LDEVs 42. Below, an LDEV 31 assigned with physical storage resources inside the first storage control device 20 is called an "internal LDEV 31", and an LDEV 42 assigned with physical storage resources of the second storage control device 40 is called an "external LDEV 42".

The LDEVs 32 indicated by the broken line inside the storage device section 8 indicate external LDEVs 42 belonging to the second storage control device 40 which have been incorporated into the first storage control device 20. In other words, in the present embodiment, an LDEV 42 which is located externally to the first storage control device 20 can be recognized as an internal LDEV 32 of the first storage control device 20 and the storage resources of this external LDEV 42 can be provided to the host device 10. The internal storage resources of the first storage control device 20 may also be assigned to the internal LDEVs 32, as well as the storage resources of the external LDEVs 42.

The controller section 6 comprises, for example, a channel adapter NAS (hereafter, called CHN) set 27 for providing NAS services, a channel adapter (CHA) set 21, a disk adapter (DKA) set 22, a service processor (SVP) 23, a cache memory 24, a shared memory 25, and a connection section 26. At least one of the CHN set 27, the CHA set 21, the DKA set 22, the cache memory 24 and the shared memory 25 may be provided in a plurality of locations.

The CHN set 27 is constituted by a plurality of (for instance, two) CHNs 27A and 27B. The CHN set 27 can maintain its role as a CHN by implementing a failover from the CHN 27A to the other CHN 27B. Since the CHNs 27A and 27B have the same functions, CHN 27A is described here as a representative example (the description in this paragraph also applies similarly to the CHA set 21 and the DKA set 22).

The CHN 27A is able to perform data communications with the host device 10, and comprises a communications port 28 which can be connected in a communicable fashion with the host device 10. Furthermore, the CHN 27A is constituted, for example, by a microcomputer system (for example, a circuit board) comprising a CPU, memory, and the like, and it is able to interpret and execute various commands received from the host device 10. The CHN 21A is assigned with a network address (for example, an IP address or WWN), for identifying that CHN 27A. The CHA 27A is able to receive an I/O command for a file unit from the host device 10, via a LAN 4, (for example, a command containing a file name, and a command for reading or writing a file having that file name, hereinafter, referred to as a "file I/O command"), and behave as a NAS for processing that file I/O command. The composition and functions of the CHN 27A are described in detail hereinafter.

The CHN 21A is able to perform data communications with the second storage control device 42, and comprises a communications port 29 which can be connected in a communicable fashion with the second storage control device 40. Furthermore, the CHAs 21A may also be constituted respectively by a microcomputer system (for example, a circuit board) comprising a CPU, memory, or the like.

The DKAs 22A send and receive data to and from the internal LDEV 31s (in other words, the disk type storage devices 30). The DKAs 22A each have a communications port 7 for connecting to the internal LDEVs 31. Furthermore, the DKAs 22A may also be constituted by a microcomputer system (for example, a circuit board) comprising a CPU, memory, or the like. Each DKA 22A converts the logical address to a physical address, when it inputs data to or outputs data from an internal LDEV 31.

The SVP 23 may be, for example, a device comprising an input/output console and a control console (for example, a personal computer), or it may be a control console (for example, a so-called "motherboard") connected to an input/output console (for example, a management terminal 15). The SVP 23 is able to control the CHNs 27A and 27B, the CHAs 21A and 21B and the DKAs 22A and 22B, by transmitting various commands to the CHNs 27A and 27B, the CHAs 21A and 21B and the DKAs 22A and 22B. Furthermore, the SVP 23 monitors the occurrence of faults in the device and indicates these on a console (for example, a display device provided in a management terminal 15), and it also instructs seal-off processing of a storage disk, or the like, on the basis of commands from the console. Furthermore, the SVP 23 is able to map the CHN 27A and the LDEVs 31 and 32, logically.

The cache memory 24 temporarily stores data received from the host device 10 and data read out form the internal LDEV 31. Control information, and the like, is stored in the shared memory 25. Furthermore, as well as establishing a work area in the shared memory 25, various types of tables, such as a mapping table Tm, described below, are also stored in the shared memory 25. It is also possible to use any one or a plurality of the internal LDEVs 31, 32 as a disk for caching.

The connection section 26 provides a mutual connection between the respective CHNs 27A, CHAs 21A, DKAs 22A, the cache memory 24 and the shared memory 25. The connection section 26 may be constituted by a high-speed bus, such as an ultra-high-speed crossbar switch, or the like, which performs data transfer by means of a high-speed switching operation.

The second storage control device 40 comprises a communications port 41 and an external LDEV 42. In addition, it may also comprise a channel adapter, disk adapter, or the like, but since the detailed structure of the second storage control device 40 is not an essential point of the present invention, description thereof is simplified here. The second storage control device 40 is connected to a first storage control device 20 via a second communications network, such as the SAN 2, (for example, a network capable of block-level data communications). The external LDEV 42 of the second storage control device 40 is handled as an internal LDEV 32 of the first storage control device 20.

Figure 2:
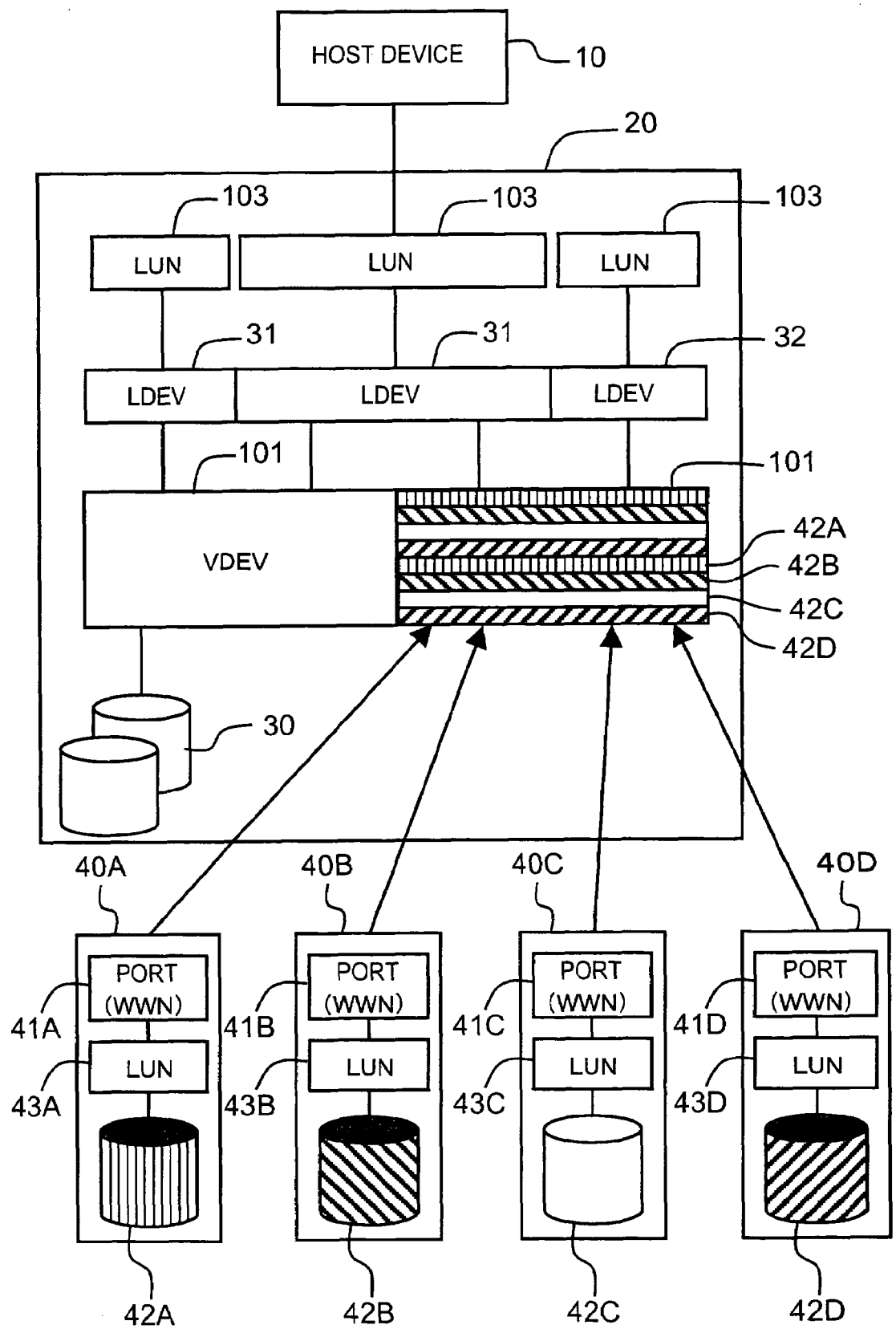
FIG. 2 is a schematic drawing showing the detailed logical structure of the first storage control device 20 and one of the internal LDEVs 32.

FIG. 2 is a schematic drawing showing the detailed logical structure of the first storage control device 20 and one of the internal LDEVs 32.

The first storage control device 20 comprises three storage layers, consisting of VDEVs 101, LDEVs 31 and 32, and LUNs (Logical Unit Numbers) 103, in ascending order.

The VDEV 101s are virtual devices situated in the bottom-most position of the logical storage layers. The VDEVs 101 are virtual representations of physical storage resources, and can be applied to a RAID structure. More specifically, it is possible to form a plurality of VDEVs 101 from a single disk type storage device 30 ("slicing"), and it is also possible to form a single VDEV 101 from a plurality of disk type storage devices 30 ("striping"). The VDEV 101 shown on the left-hand side in FIG. 2 is a virtual representation of a disk type storage device 30 according to a prescribed RAID structure, for example.

On the other hand, the VDEV 101 shown on the right-hand side in FIG. 2 is constituted by mapping an external LDEV 42 of the second storage control device 40. More specifically, in the present embodiment, by mapping an external LDEV 42 of the second storage control device 40 to the VDEV 101 by using the mapping table Tm described below, it becomes possible to use that external LDEV 42 as an internal LDEV 32 of the first storage control device 20. In the example shown in the drawings, the VDEV 101 is composed by striping four external LDEVs 42A-42D. Each of the external LDEVs 42A-42D can be accessed respectively and independently via respective communications ports 41A-41D, by identifying respective LUNs 43A-43D. A WWN, which provides unique identification information, is assigned to each communications port 41A-41D, and a LUN is set for each LUN 43A-43D, in such a manner that an external LDEV can be identified by means of the combination of the WWN and the LUN.

An internal LDEV 32 is provided on the VDEV 101. The internal LDEV 32 is an LDEV which virtualizes the VDEV 101. It is possible to connect two LDEVs 32 to one VDEV 101, or to connect one LDEV 32 to a plurality of VDEVs 101. The LDEVs 32 can be accessed via respective LUNs 103.

FIG. 3 shows an example of the composition of a mapping table Tm.

The mapping table Tm is a table for mapping external LDEVs 42 to VDEVs 101. In the mapping table Tm, for example, a VDEV number which is associated with fault information and external device information is assigned to each VDEV 101 and this number serves to identify the VDEV 101 universally.

The fault information is information that indicates the presence or absence of a fault in the access path to the external LDEV 42 corresponding to that VDEV 101. If there is a fault, then it is recorded as "error", for example, and if there is no fault, then it is recorded as "normal".

The external device information may be identification information for the external LDEV 42 (device identification information), information indicating the storage capacity of the external LDEV 42 and the type of storage device belonging to the external LDEV 42 (for example, if it is a tape-based device of a disk-based device), or information indicating the path to the external LDEV 42. This path information includes, for example, the identification information (WWN) that is unique to the respective communications port 41, and the LUN 43.

The device identification information and WWN, and the like, illustrated in FIG. 3 are values used for the sake of the description, and do not have any particular meaning. Moreover, the VDEV 101 having VDEV number "3" shown at the bottom of FIG. 3 is associated with three path information elements. More specifically, the external LDEV 42 mapped to this VDEV 101 (#3) has an internal alternative path structure comprising three paths, and it is mapped to the VDEV 101 (#3) by recognizing this alternative path structure. Since it is recognized that the same storage region can be accessed by passing via any one of these three paths, then even if a fault, or the like, occurs in any one or any two or the paths, it is still possible to access the desired data by means of the remaining path which is operating normally.

By adopting the mapping table Tm shown in FIG. 3, it is possible to map one or a plurality of external LDEVs 42 to one or more VDEV 101 in the first storage control device 20.

Next, one example of a method of mapping an external LDEV 42 to a VDEV 101 is described with reference to FIG. 4. FIG. 4 is a time chart showing the principal parts of the processing carried out between the first storage control device 20 and the second storage control device 40 during a mapping operation.

Firstly, the first storage control device 20 logs in to the second storage control device 40 by means of an initiator port 29 of the CHA 21A (step S1). Log in is completed by means of the second storage control device 40 sending a reply to the log-in operation of the first storage control device 20 (S2). Next, the first storage control device 20 sends an inquiry command defined according to SCSI (Small Computer System Interface) standards, for example, to the second storage control device 40, in order to elicit a response concerning the details of the storage devices 42 of the second storage control device 40 (S3).

The inquiry command is used to clarify the type and composition of the device to which the inquiry is addressed, and it allows the physical structure of the device under inquiry to be ascertained by passing through the hierarchical layers of the device. By using the inquiry command, the first storage control device 20 is able to obtain from the second storage control device 40, for example, the device name, device type, serial number (product ID), device identification information (for example, the LDEV number), version information, the vendor ID, and the like (S4). The second storage control device 40 sends the requested information to the first storage control device 20 as a reply (S5).

The first storage control device 20 registers the information obtained from the second storage control device 40 in a prescribed location of the mapping table Tm (S6). Thereupon, the first storage control device 20 reads out the storage capacity of the storage device 42 from the second storage control device 40 (S7). The second storage control device 40 returns the storage capacity of the storage device 42, in response to this inquiry from the first storage control device 20 (S8), and sends a reply (S9). The first storage control device 20 registers the storage capacity of the storage device 42 in a prescribed location of the mapping table Tm (S10).

By means of the aforementioned processing, a mapping table Tm can be constructed. When data is input or output between external LDEVs 42 that have been mapped to a VDEV 101 of the first storage control device 20, the data address, and the like, can be converted by referring to another table, which is described hereafter. Furthermore, by constructing a mapping table Tm, it is possible to associate the CHNs 27A and 27B, and the CHAs 21A and 21B, with respective LDEVs in the first storage control device 20 (in other words, paths can be defined for same). More specifically, a path can be defined to an LDEV regardless of whether it is an LDEV 31 or an LDEV 32 (in other words, an external LDEV 42). The path definitions are made by inputting information via the SVP 23. The defined path can be constructed by means of information containing a combination of the LUN and the LDEV #. After defining the path, for example, the first CHN 27A creates a file system for the LDEVs whose paths have been defined, and it mounts that file system on the OS of the NAS processor (explained hereinafter). By mounting the file system in a position where it can be shared by the host device 10, it becomes possible for the host device 10 to access the LDEVs whose paths have been defined.

Data input and output between the first storage control device 20 and the second storage control device 40 is now described with reference to FIG. 5 to FIG. 7. Firstly, a case where data is written will be described on the basis of FIG. 5 and FIG. 6. FIG. 5 is a schematic diagram showing processing in the case of data writing. FIG. 6 is an illustrative diagram showing the sequence of processing in FIG. 5, in relation to the respective tables.

If the write destination of the data from the host device 10 is an LDEV 31, in other words, if the LDEV to which the host device 10 wishes to write data is connected to an internal disk type storage device 30 via a VDEV 101, then the data is written by means of a normal process. More specifically, the data from the host device 10 is stored in the cache memory 24, and is then stored at a prescribed address on the disk storage device 31, from the cache memory 24, via the DKA 22A. In this case, the DKA 22A converts the logical address to a physical address.

On the other hand, if the write destination of the data from the host device 10 is an LDEV 32, in other words, if the LDEV to which the host device 10 wishes to write data is connected to an external LDEV 42 via a VDEV 101, then the data is written by following the sequence illustrated in FIG. 5.

FIG. 5A is a flow diagram which is centered on illustrating the storage layers, and FIG. 5B is a flow diagram which is centered on illustrating the method of using the cache memory 24.

The host device 10 issues a write command (Write) specifying an LDEV number indicating the LDEV 32 forming the write destination and a WWN identifying the communications port 21A used to access that LDEV 32 (S21A). Here, a file-level write command (file I/O command) is issued. The CHN (E-NAS (Embedded NAS)) 27A of the first storage control device 20 receives this file-level write command and converts the write command to a block-level write command (block I/O command). It then outputs the converted block-level write command (S21B).

The CHA 21A of the first storage control device 20 receives the block-level write command output by the CHN 27A, generates a write command for transmission to the second storage control device 40, on the basis of this write command, and then sends the generated command to the second storage control device 40 (S22). The CHA 21A is able to generate a new write command by changing the write destination address information, and the like, contained in the received write command, in accordance with the external LDEV 42.

Next, the host device 10 sends the data to be written, to the first storage control device 20 (S23A). The data received by the CHN 27A of the first storage control device 20 is transferred from the LDEV 32, via the VDEV 101 (S23B and S24), to the external LDEV 42 (S26). Here, the CHN 27 returns a writing completed response (Good) to the host device, at the time that the data from the host device 10 has been stored in the cache memory 24 (S25A and S25B). At the time that it receives the data from the first storage control device 20 (or the time that it completes writing to the external LDEV 42,) the second storage control system 40 transmits a writing completed report to the first storage control device 20 (S26) In other words, the timing at which the first storage control device 20 reports write completion to the host device 10 (S25A and S25B) is different from the timing at which the data is actually stored in the external LDEV 42 (although these timings may be substantially the same). Therefore, the host device 10 is released from the data write processing before the data is actually stored in the external LDEV 42, and hence it can proceed to carry out other processing.

Referring now to FIG. 5B, a plurality of sub-blocks 24A are provided in the cache memory 24. The CHN 27A stores data in a prescribed location of the cache memory 24 by converting the logical block address specified by the host device 10 to a sub-block address (S24).

Figure 6A:
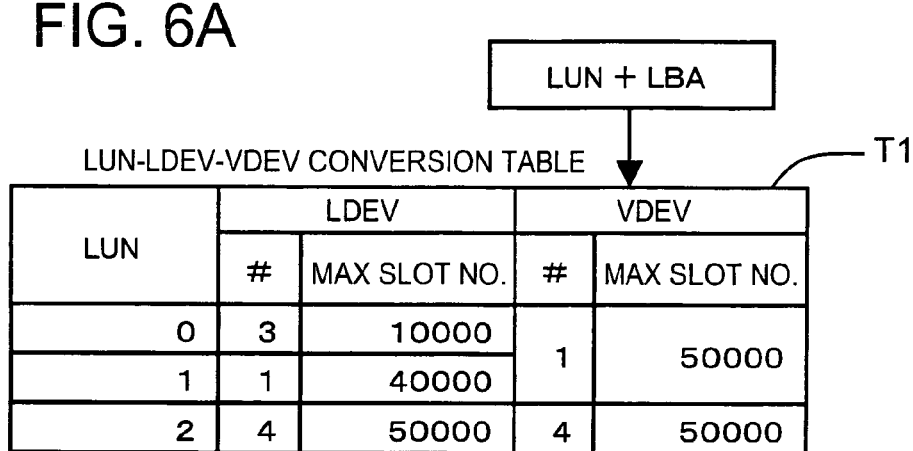
FIG. 6A shows an example of the composition of a first conversion table T1.

The procedure of converting data by means of the various tables is now described with reference to FIG. 6. As shown in the upper portion of FIG. 6, the host device 10 sends data to a prescribed communications port 28, specifying the LUN and the logical block address (LBA). The first storage control device 20 converts the data input for a LDEV 32 (LUN+ LBA), into data for a VDEV 101, on the basis of the first conversion table T1 illustrated in FIG. 6A. The first conversion table T1 is a LUN–LDEV–VDEV conversion table for converting data which specifies an internal LUN 103, into data for a VDEV 101. This table T1 is constituted by mutual associations between, for example, a LUN, the number of a LDEV 32 corresponding to that LUN (LDEV #) and the maximum slot number thereof, and the number of a VDEV 101 corresponding to the LDEV 32 (VDEV#) and the maximum slot number thereof, and the like. By referring to this table T1, the data from the host device 10 (LUN+LBA) is converted into data for a VDEV 101 (VDEV#+SLOT#+SUB-BLOCK #).

Figure 6B:
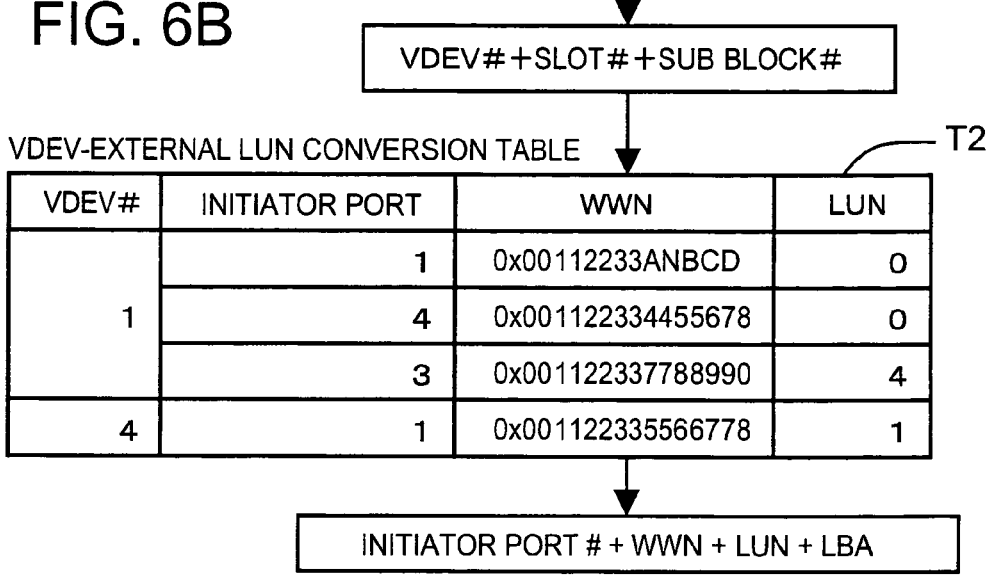
FIG. 6B shows an example of the composition of a second conversion table T2.

Thereupon, the first storage control device 20 refers to the second conversion table T2 illustrated in FIG. 6B, and converts the data for the VDEV 101 into data for storage by transmission to an external LUN (LDEV 42) in the second storage control device 40. The second conversion table T2 contains mutual associations between, for example, a VDEV 101 number (VDEV#), the number of the initiator port for transmitting the data from the VDEV 101 to the second storage control device 40, the WWN for identifying the communications port 41 to which data is to be transferred, and the LUN which can be accessed via that communications port. On the basis of this second conversion table T2, the first storage control device 20 converts the destination information for the data to be stored, into the format of: initiator port number #+WWN+LUN+LBA. This data comprising changed destination information is transmitted from the designated initiator port, via the SAN2, and arrives at the designated communications port 41. Thereupon, the data is stored in a prescribed location of the external LDEV 42 which can be accessed by means of the specified LUN 43. The external LDEV 42 is constructed logically on a physical storage device (for example, a disk type storage device), and therefore, the data address is converted to a physical address and the data is stored in a prescribed address of a prescribed storage device.

Figure 6C:
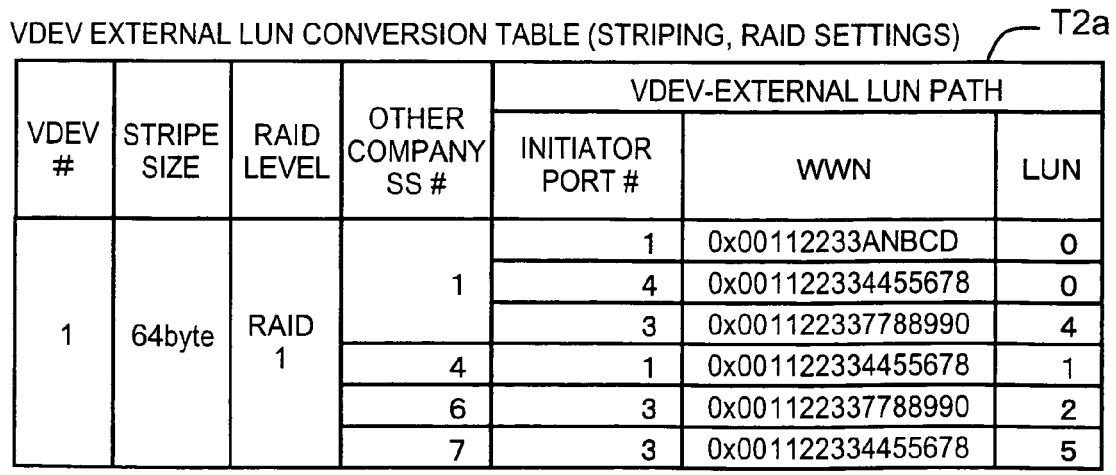

FIG. 6C shows an example of the composition of another second conversion table T2a. This conversion table T2a is used in a case where striping or a RAID configuration is used in the VDEV 101 which originates in the external storage device 42. The conversion table T2a is constituted by mutual associations between a VDEV number (VDEV#), a stripe size, a RAID level, a number for identifying the second storage control device 40 (SS# (storage system number)), an initiator port number, a WWN of a communications port 41, and the number of a LUN 43. In the example shown in FIG. 6C, one VDEV 101 constitutes RAID 1, by using a total of four external storage control systems identified by the SS# (1, 4, 6, 7). Moreover, the three LUN assigned to SS #1 (#0, #0, #4) are established for the same device (LDEV #). The volume of LUN #0 is provided with an alternative path structure having two access data paths. In this way, in the present embodiment, it is possible to provide additional functions, such as striping or a RAID configuration, or the like, to the host device 10, by constituting a VDEV 101 from a plurality of logical volumes (LDEVs) which are located externally.

At least one of the tables T1, T2 and T2a described above may be stored in the shared memory 25.

The sequence of processing in a case where data is read from an external LDEV 42 of the second storage control system 40 is now described with reference to FIG. 7.

Firstly, the host device 10 sends a data read command to the first storage control device 20, specifying a communications port 28 (S31A). Here, a file-level read command (file I/O command) is issued. The CHN 27A of the first storage control device 20 receives the file-level read command and converts this read command to a block-level read command (block I/O command). The CHN 27A outputs the converted block-level read command (S31B). The CHA 21A receives the read out command output by the CHN 27A, generates a read command for transmission to the second storage control device 40, on the basis of this read command, and then sends the generated command to the second storage control device 40 (S32). The second storage control device 40 reads out the requested data from the external LDEV 42, in response to the read command received from the first storage control device 20, and it sends the data to the first storage control device 20 (S33). The second storage control device 40 then reports that read out has completed normally (S35). As shown in FIG. 7B, the CHA 21A of the first storage control device 20 stores the data received from the second storage control device 40, at a prescribed location in the cache memory 24 (S34). The CHA 21A is able to report this fact to the CHN 27A.

The CHN 27A of the first storage control device 20 reads out the data stored in the cache memory 24 (S36A) and after converting the data address, it sends the data to the host device 10 via the LUN 103, or the like (S36B). The CHN 27A reports completion of the read operation (S37A and S37B). In this sequence of processing for reading out data, the conversion operation described with respect to FIG. 7 is carried out in the reverse direction.

FIG. 7 shows a case where data is read out from the second storage control device 40 in response to a request from the host device 10, and this data is stored in the cache memory 24. However, the sequence is not limited to this, and it is also possible for all or a portion of the data stored in the external LDEV 42 to be stored previously in the cache memory 24. In this case, the data can be read out immediately from the cache memory 24 and transmitted to the host device 10, in response to a read out command from the host device 10.

As described above, in the present embodiment, by connecting the external LDEV 42 to an intermediate storage layer (VDEV 101, LDEV 32) situated between the LUN 103 and the external LDEV 42, it is possible to use the external LDEV 42 as an internal LDEV 32 of the first storage control device 20 (hereinafter, this technology may also be called "external connection technology"). This external connection technology may use the technology described in Japanese Patent Application No. 2003-337239 or U.S. patent application Ser. No. 10/769,805 (not published as the time of the current application).

Figure 8:
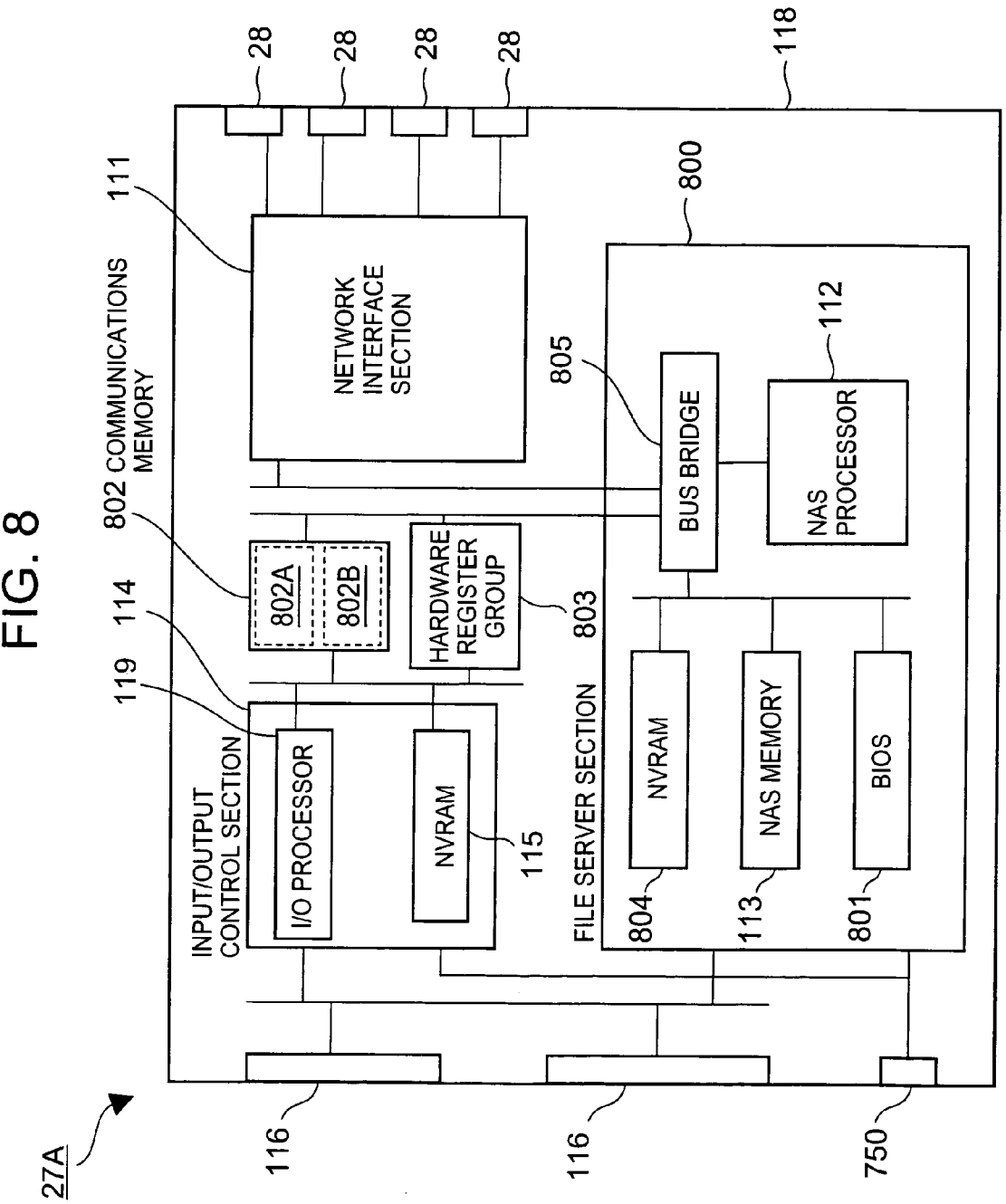
FIG. 8 shows an example of the composition of the CHN 27A.

FIG. 8 shows an example of the composition of the CHN 27A.

The CHN 27A comprises a network interface section 111, an input/output control section 114, a board connector 116, a communications memory 802, a hardware register group 803, a communications port 28 and a file server section 800. The input/output control section 114 comprises, for example, a NVRAM (NonVolatile RAM) 115, I/O (Input/Output) processor 119.

The CHN 27A is installed in a slot on the first storage control device 20 and is thereby connected to the connection section 26 via the board connector 116. Furthermore, the CHN 27A is supplied with power from the first storage control device 20, via a power supply connector 750. The power supply control circuit and a hardware register group 803 for controlling the power supply control circuit are installed in the CHN 27A, and by setting programmed values in the hardware register group 803, it is possible to control the supply and blocked status of electrical power to the input/output control section 114 and the file server section 800. Furthermore, in addition to controlling the power supply, by changing the values set by the hardware register group 803, it is also possible to control hardware operations, such as rebooting, transfer to diagnosis mode, and the like, of the input/output control section 114 or the file server section 800, as well as supplying and shutting off the power supply. Thereby, the I/O processor 119 of the input/output control unit is able to perform hardware control of operations such as starting or shutting off the power supply to the NAS processor 112, rebooting, transfer to diagnosis mode, and the like. Furthermore, the NAS processor 112 of the file server section 800 may, conversely, perform hardware control of the I/O processor 119 of the input/output control section, such as starting or shutting off the power supply, rebooting, transfer to diagnosis mode, or the like.

The network interface section 111 comprises a communications interface for communicating with the host device 10. In the case of the CHN 27A, a file access request transmitted by the host device 10 is received in accordance with a TCP/IP protocol, for example. The communications port 8 is a connector for communicating with the host device 10. In the case of CHN 27A, it is a connector which can be connected to a LAN, and corresponds to an Ethernet (registered trade name), for example.

The file server section 800 comprises a NAS processor 112, a NAS memory 113, a bus bridge 805, a BIOS (Basic Input/Output System) 801, and an NVRAM 804.

The NAS processor 112 is a CPU which has a faster processing speed than the I/O processor 119, for example. The NAS processor 112 is able to perform processing, such as analyzing a file I/O command designating a file, converting the file I/O command into a block I/O command, sending the block I/O command to the I/O processor 119, and the like.

Various types of programs or data are stored in the NAS memory 113.

The BIOS 801 is software which is loaded firstly in the NAS memory 113 and executed in the process of starting up the NAS processor 112, when the power supply to the CHN 27 is switched on, for example. The BIOS 801 is saved to a non-volatile medium, such as a flash memory, and installed in the CHN 27A. The NAS processor 112 is able to implement initialization, diagnosis, and the like, of parts relating to the NAS processor 112 on the CHN 27A, by executing software read in from the BIOS 801 to the NAS memory 113. Furthermore, the NAS processor 112 is able to read in a prescribed program, for example, the OS boot part, from the internal LDEV 31 to the NAS memory 113, by issuing an instruction, such as a command, from the BIOS 801 to the I/O processor 119. The OS boot part thus read in also performs an operation of reading in the main part of the OS stored in the internal LDEV 31, to the NAS memory 113. Consequently, the OS is started up on the NAS processor 112, and file server processing, for example, can be implemented.

The bus bridge 805 links the network interface section 111 and the input/output control section 119 with the file server section 800.

The input/output control section 114 sends and receives data and commands between the disk adapters 22, the cache memory 24, the shared memory 25 and the control unit 23.

The I/O processor 119 is constituted by a single-chip microcomputer, for example. The I/O processor 119 controls read or write requests relating to the data in the LDEVs 31 and 32, as well as the transmission and reception of that data, and it relays communications between the NAS processor 112 and the disk adapter 22. The NVRAM 115 is a nonvolatile memory storing programs for controlling the CPU 119.

The hardware register group 803 is connected to a circuit which switches on or shuts off the power supply to the NAS processor 112, for example. In this way, by accessing the hardware register group 803, the I/O processor 119 is able to control the power supply to the NAS processor 112, by means of the hardware register group 803. The hardware register group 803 has a plurality of functions for generating an interrupt (hereafter, also called a "doorbell") to the destination of an access operation, reporting that access has been performed, and so on, as and when necessary, when it has been accessed by the NAS processor 112 or the I/O processor 119. This plurality of functions may be allocated in the form of hardware to the respective registers which make up the hardware register group 803.

The storage region of the communications memory 802 can be divided logically into a data region 802A that is used in order to transfer information from the I/O processor 119 to the NAS processor 112, and a data region 802B that is used in order to transfer information from the NAS processor 112 to the I/O processor 119.

FIG. 9A shows an example of the structure of the data stored in the data region 802A.

The information transferred from the I/O processor 119 to the NAS processor 112 includes, for example, the startup device type, diagnosis implementation flag, a plurality of drive numbers, timing information, number of command retries, command time-out value, and a plurality of temperature information elements. The startup device type is the type of device that is started up under the control of the BIOS 801 when the NAS processor 112 is activated. The startup device type may be, for example, a network, a disk drive, or the like. The drive number is a number for selecting the disk drive from which the OS is loaded, if the startup device type is a disk drive. The present embodiment uses a concept of LDEVs inside the storage devices 31 and 32, and the OS, and the like, is stored in the LDEVs. Therefore, the LDEV numbers which distinguish each LDEV are regarded as drive numbers. An order of priority is assigned to the drive numbers, for example, and if the drive number 0 has priority over the drive number 1, then the NAS processor 112 firstly attempts start-up from the LDEV designated by drive number 0. If this start-up fails, then it is able to attempt start-up from the LDEV designated by drive number 1. The diagnosis implementation flag is used by the I/O processor 119 to indicate to the BIOS 801 whether or not a hardware diagnosis relating to the file server section 800 is carried out when the NAS processor 112 is started up. If, for example, the NAS processor 112 alone is restarted once initialization of the file server section 800 has been completed, then the BIOS 801 does not require hardware diagnosis to be implemented again. In cases such as this, it is possible to prevent the NAS processor 112 from re-implementing a hardware diagnosis of the file server section 800, by means of the I/O processor 119 setting the diagnosis implementation flag to a suitable value. The timing information is used when the BIOS 112 or OS operates on the NAS processor 112. The I/O processor 119 obtains timing information from the control unit 23 and transfers this information to the NAS processor 112. In this way, timing information can be synchronized between the control unit 23, the I/O processor 119 and the NAS processor 112. The number of command retries and the command time-out value indicate the conditions for operation and time out of the BIOS 801 or OS on the NAS processor 112, if a command issued to the I/O processor 119 by the NAS processor 112 has failed. The temperature information is a value set with respect to the NAS processor 112 in order that the NAS processor 112 is able to detect any abnormal changes in its own temperature.

FIG. 9B shows an example of the structure of the data stored in the data region 802B.

The BIOS version is the version of the object code of the BIOS 801, and this is transferred from the NAS processor 112 to the I/O processor 119, and then transferred from the I/O processor 119 to the management terminal 160. The MAC address is a MAC address of the NAS processor 112. The MAC address is a hardware identifier that is unique on a worldwide level, and it contains information that is required when allocating an IP address to the DHCP server on the LAN in accordance with the IP protocol. The 0 padding information serves to cover over the word boundaries, and it does not contain relevant information.

Figure 10A:
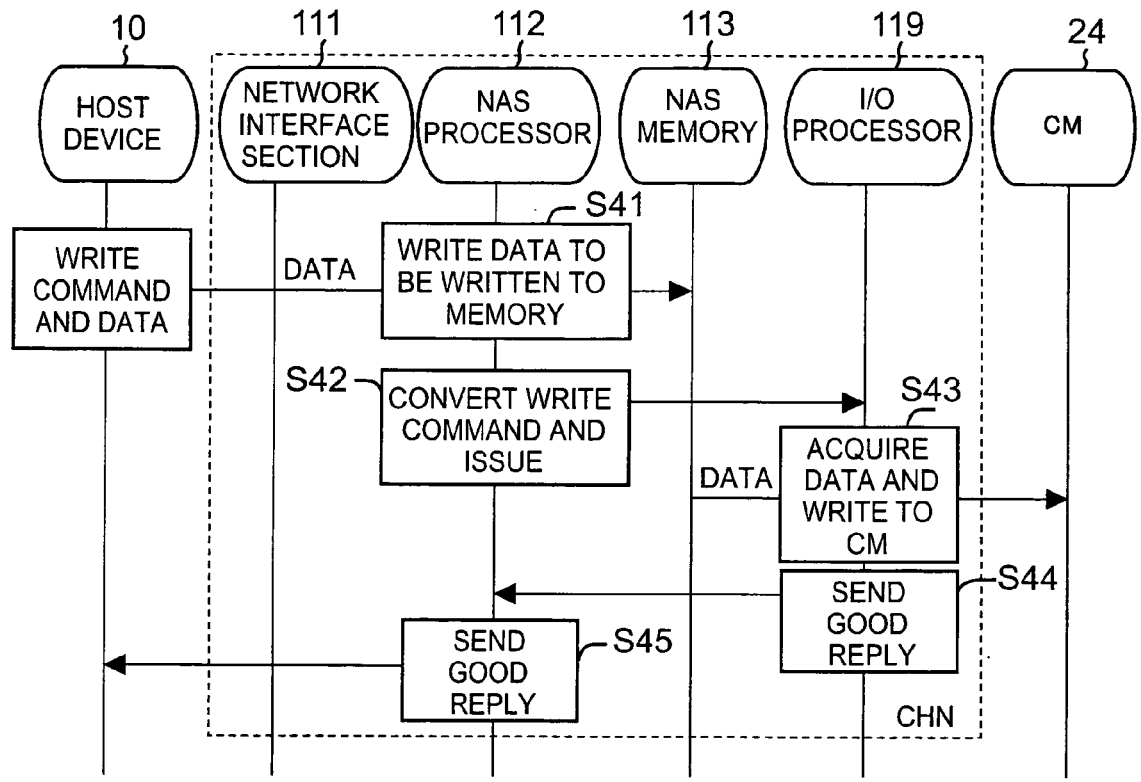
FIG. 10A shows one example of the sequence of processing implemented in the CHN 27A when a write command or write data is received.

FIG. 10A shows one example of the sequence of processing implemented in the CHN 27A when a write command or write data is received.

The NAS processor 112 receives the write data and the file-level write command, via the network interface section 111, and it writes the write data to the NAS memory 113 (S41). Furthermore, the NAS processor 112 converts the file-level write command to a block-level write command, and it sends this block-level write command to the I/O processor 119 (S42).

The I/O processor 119 receives the block-level write command, and in response to this, it obtains write data from the NAS memory 113 and writes the write data thus obtained to the cache memory 24 (S43). The I/O processor 119 reports a write success (Good) to the NAS processor 112 (S44). Upon receiving the write success report, the NAS processor 112 reports this write success to the host device 10 (S45).

Figure 10B:
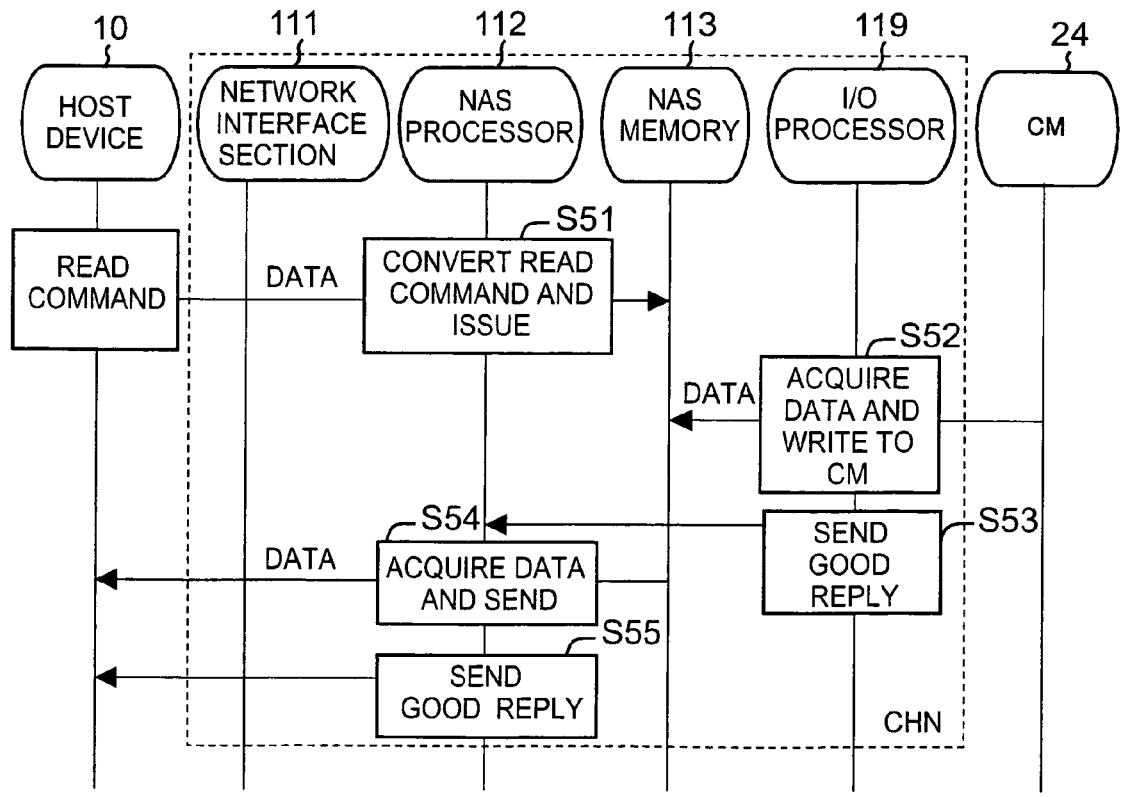
FIG. 10B shows one example of the sequence of processing implemented by the CHN 27A upon receiving a read command.

FIG. 10B shows one example of the sequence of processing implemented by the CHN 27A upon receiving a read command.

The NAS processor 112 receives a file-level read command via the network interface section 111, converts the file-level read command to a block-level read command, and sends the block-level read command to the I/O processor 119 (S51).

The I/O processor 119 receives the block-level read command, and in response to this, it obtains read-out data from the cache memory (CM) 24 and writes the read-out data thus obtained to the NAS memory 113 (S52). Here, the I/O processor 119 is able to request read-out data of the DKA 22A or CHA 21A, if the read-out data is not present in the cache memory 24. The DKA 22A or the CHA 21A is able to obtain the read-out data from the internal LDEV 31 or external LDEV 42, in response to this request, and write the obtained read-out data to the cache memory 24.

The I/O processor 119 reports a read success (Good) to the NAS processor 112, when the read-out data has been written to the NAS memory 113 (S53). Upon receiving this read success report, the NAS processor 112 acquires the read-out data from the NAS memory 113, sends the data to the host device 10 (S54), and reports the read success to the host device 10 (S55).

The foregoing described an example of the composition of the CHN 27A.

At least two of the processors of the NAS processor 112 and the I/O processor 119 are mounted in the CHN 27A, but the number of processors does not necessarily have to be two, and more than two or fewer than two processors may be provided, respectively. The NAS processor 112 is not able to access the shared memory 25 and the cache memory 24, but the I/O processor 119 is able to access the shared memory 25 and the cache memory 24.

If a file I/O command is issued from the host device 10 to the internal LDEV 32, then the NAS processor 112 converts the file I/O command into a block I/O command, and the I/O processor 119 outputs the block I/O command to the connection section 26. Accordingly, the CHA 21A receives this block I/O command, generates a block I/O command in order to access an external LDEV 42 that has been mapped to an internal LDEV 32 via a VDEV 101, on the basis of this block I/O command, and sends the generated block I/O command to the second storage control device 40. In this way, the storage resources of the external LDEV 42, which is taken to be an internal LDEV 32, can be provided to the host device 10.

Figure 11A:
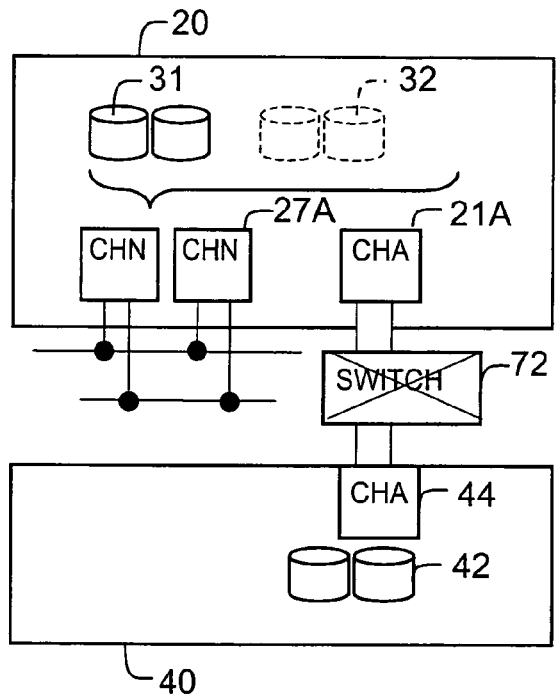
FIG. 11A shows a switching fault.
Figure 11B:
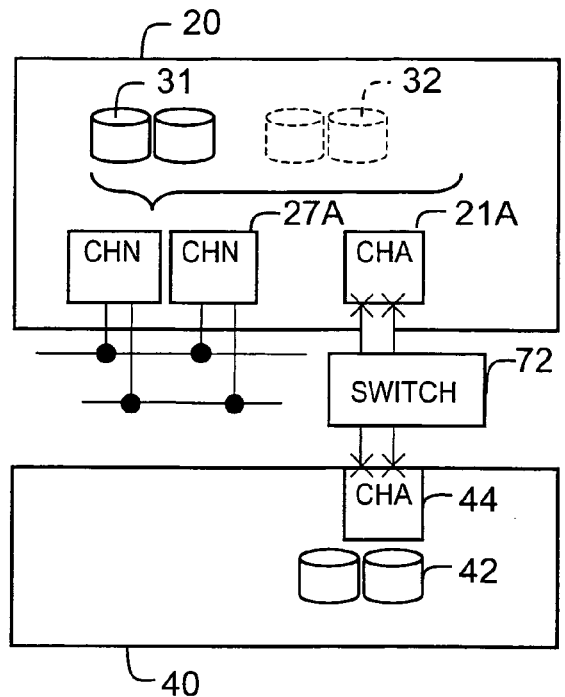
FIG. 11B shows a port-related fault.
Figure 11C:
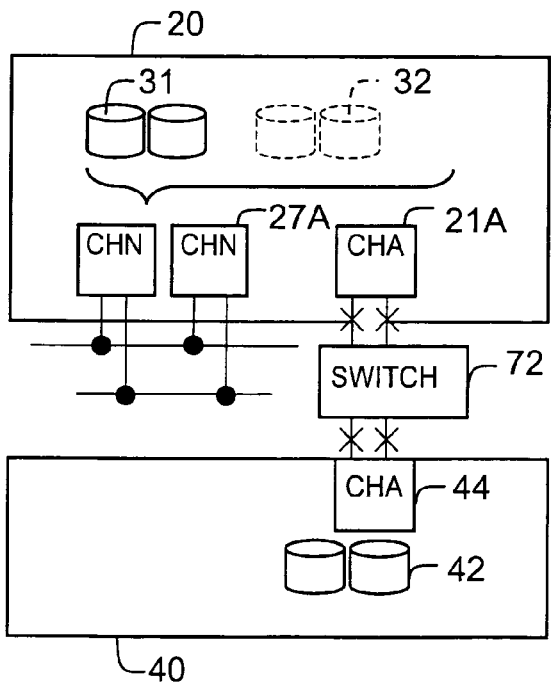
FIG. 11C shows a path fault.
Figure 11D:
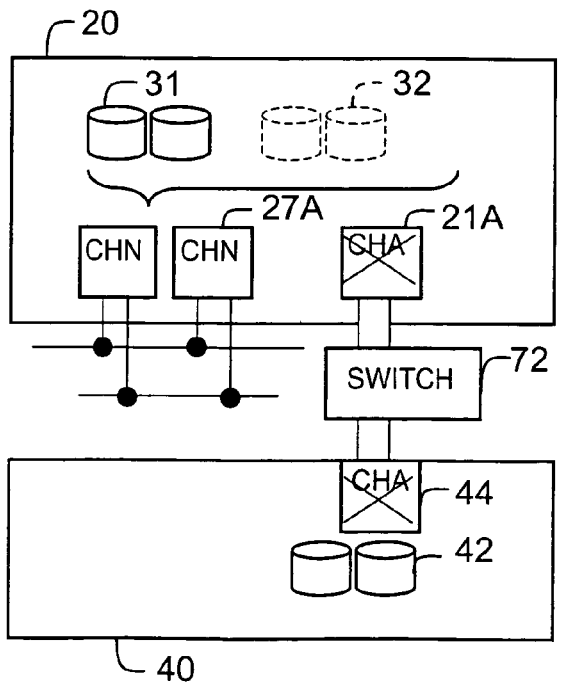
FIG. 11D shows a CHA fault.

Here, if a fault of some type has occurred in the access path to the external LDEV 42, then the CHA 21A is not able to access the external LDEV 42. Here, a "fault of some type" indicates, for example, a fault in the switch 72 comprising the SAN 2 (see FIG. 11A), a fault in at least one of the port 29 of the CHA 21A of the first storage control device 20 and/or the port of the CHA 44 of the second storage control device 40 (not illustrated) (see FIG. 11B), a fault in at least one of the communications path connecting the CHA 21A and the switch 72 and the communications path connecting the CHA 44 and the switch 72 (see FIG. 11C), and a fault in at least one of the CHA 21A and the CHA 44 (see FIG. 11D).

The CHN 27A is able to judge that a fault has occurred, if the CHA 21A is not able to access the external LDEV 42. More specifically, for example, the CHN 27A is able to block the external LDEV 42 (in other words, to set it as a non-accessible LDEV), if a prescribed period of time has elapsed without the CHN 27A being able to achieve access, or if it has not achieved access after retrying access a prescribed number of times. One feature of the present embodiment is that, if the system is recovered from the fault, then this recovery is detected in some way by the CHN 27A. Below, these features will be described.

Figure 12:
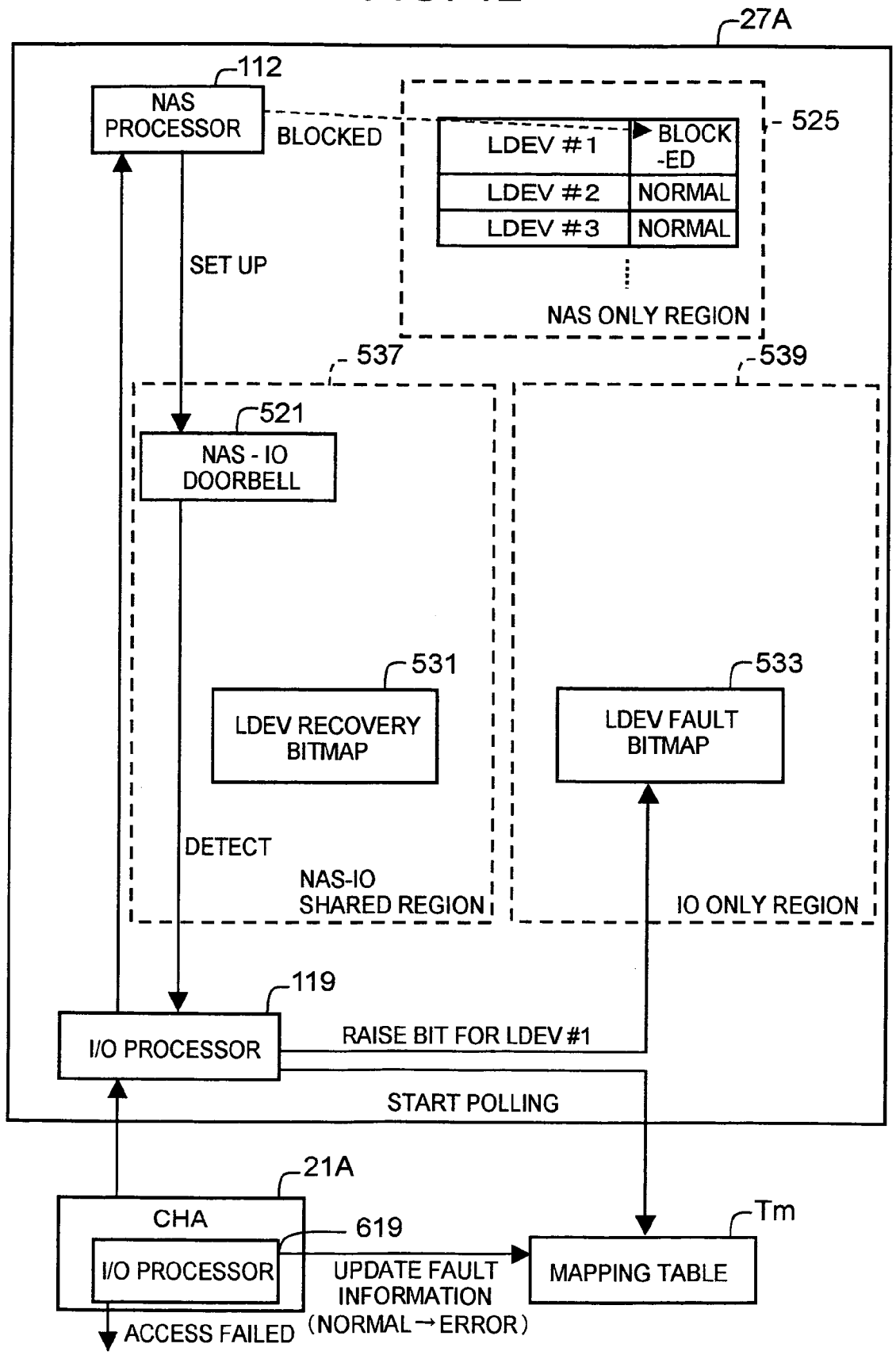
FIG. 12 shows an illustrative diagram of the processing carried out in a case where a fault has occurred in the access path to the external LDEV.

FIG. 12 shows an illustrative diagram of the processing carried out in a case where a fault has occurred in the access path to the external LDEV.

The CHN 27A comprises a storage region which can be accessed by the NAS processor 112 but cannot be accessed by the I/O processor 119 (hereafter, called the NAS-only region) 525, a storage region which can be accessed by the I/O processor 119 but cannot be accessed by the NAS processor 112 (hereafter, called the I/O-only region) 539, and a storage region which can be accessed by either the NAS processor 112 or the I/O processor 119 (hereafter, called the NAS-IO shared region) 537.

The NAS-only region 525 can be provided on the NAS memory 113, for example. The NAS-only region 525 is used to manage the file systems of the respective LDEVs 31 and 32, for example.

The IO-only region 539 can be provided on the NVRAM 115, for example. An LDEV fault bitmap 533 indicating the presence or absence of a fault in each LDEV is stored in the IO-only region 539. The LDEV fault bitmap 533 contains 256 bits which correspond respectively to 256 LDEVs, for example, as illustrated in FIG. 13A. If each bit (hereafter, the fault bit) is raised (for example, if it is set to "1"), then this indicates "fault present", and if it is lowered (for example, if it is set to "0"), then this indicates "no fault". The I/O processor 119 is able to judge whether or not there is a fault in the accessed LDEV, by referring to the LDEV fault bitmap 533.

The NAS-OS shared region 537 may be provided on at least one of the hardware register group 803 and/or the communications memory 802, for example. An LDEV recovery bitmap 531 indicating the presence or absence of recovery in each LDEV is stored in the NAS-OS shared region 537. The composition of the LDEV recovery bitmap 531 can be similar to that of the LDEV fault bitmap 533. In other words, the LDEV recovery bitmap 531 may comprise 256 bits which correspond respectively to 256 LDEVs, as in the example shown in FIG. 13B, for instance. If each bit (hereafter, the recovery bit) is raised (for example, if it is set to "1"), then this indicates "recovery exists", and if it is lowered (for example, if it is set to "0"), then this indicates "no recovery". The I/O processor 119 and the NAS processor 112 are able to judge whether or not there has been a recovery in the accessed LDEV, by referring to the LDEV recovery bitmap 531. Furthermore, by referring to the LDEV fault bitmap 533, the I/O processor 119 is able to judge that an LDEV indicated as "no recovery" is in a fault state, if the fault bit for that LDEV is raised. If the fault bit is not raised, then it can judge that the LDEV is in a normal state.

FIG. 14 shows the processing sequence carried out in a case where a fault has occurred in the access path to an external LDEV. Below, this processing sequence is described with reference to FIG. 14 and FIG. 12. In this case, in order to make the description easier to understand, the LDEV number (LDEV #) of the internal LDEV 32 corresponding to the external LDEV 42 being accessed is taken to be "LDEV #1".

If a fault has occurred in the access path to the external LDEV 42 (S101), then the I/O processor 619 of the CHA 21A is not able to access that external LDEV 42. In this case, the I/O processor 619 is able to recognize that a fault has occurred (S102).

On the other hand, if the NAS processor 112 does not obtain a prescribed response (for example, an access success report), after outputting a block I/O command to the I/O processor 119 in respect of the internal LDEV 32 corresponding to external LDEV 42, and more specifically, if a prescribed time period has elapsed after outputting the block I/O command or if a prescribed response has not been obtained even after outputting the block I/O command a prescribed number of times, then the NAS processor 112 shuts off the internal LDEV 32 (the LDEV having LDEV #1), and sets a doorbell for the I/O processor 119 (hereinafter, called "NAS-IO doorbell") 521 in the NAS-IO shared region 537 (S103). By this means, a fault in the LDEV 32 is reported to the I/O processor 119. The method of reporting the fault from the NAS processor 112 to the I/O processor 119 is not limited to a method using a doorbell, and another type of method may be used.

The I/O processor 619 which has recognized the presence of a fault at S102 identifies the VDEV# corresponding to the LDEV 32 of LDEV# 1, upon recognizing the fault, and it updates the fault information corresponding to the identified VDEV#, from "normal" to "error" (S104). The VDEV # corresponding to LDEV # 1 can be identified from the first table T1 shown in FIG. 7A, for example.

In the CHN 27A, the I/O processor 119 implements processing for referencing the mapping table Tm, at regular or irregular intervals, when it has received a fault report based on a NAS-IO doorbell 521. If the I/O processor 119 detects a VDEV # having fault information set to "error", then it accesses the LDEV fault bitmap 533 and raises the fault bit for LDEV #1 which corresponds to the detected VDEV # (S105).

Thereafter, if the NAS processor 112 receives a file I/O command relating to the LDEV 32 having LDEV #1, then it does not implement processing for converting the file I/O command into a block I/O command. In other words, from the viewpoint of the I/O processor 119, it appears as though no block I/O command has arrived relating to the LDEV 32 having LDEV #1.

Figure 15:
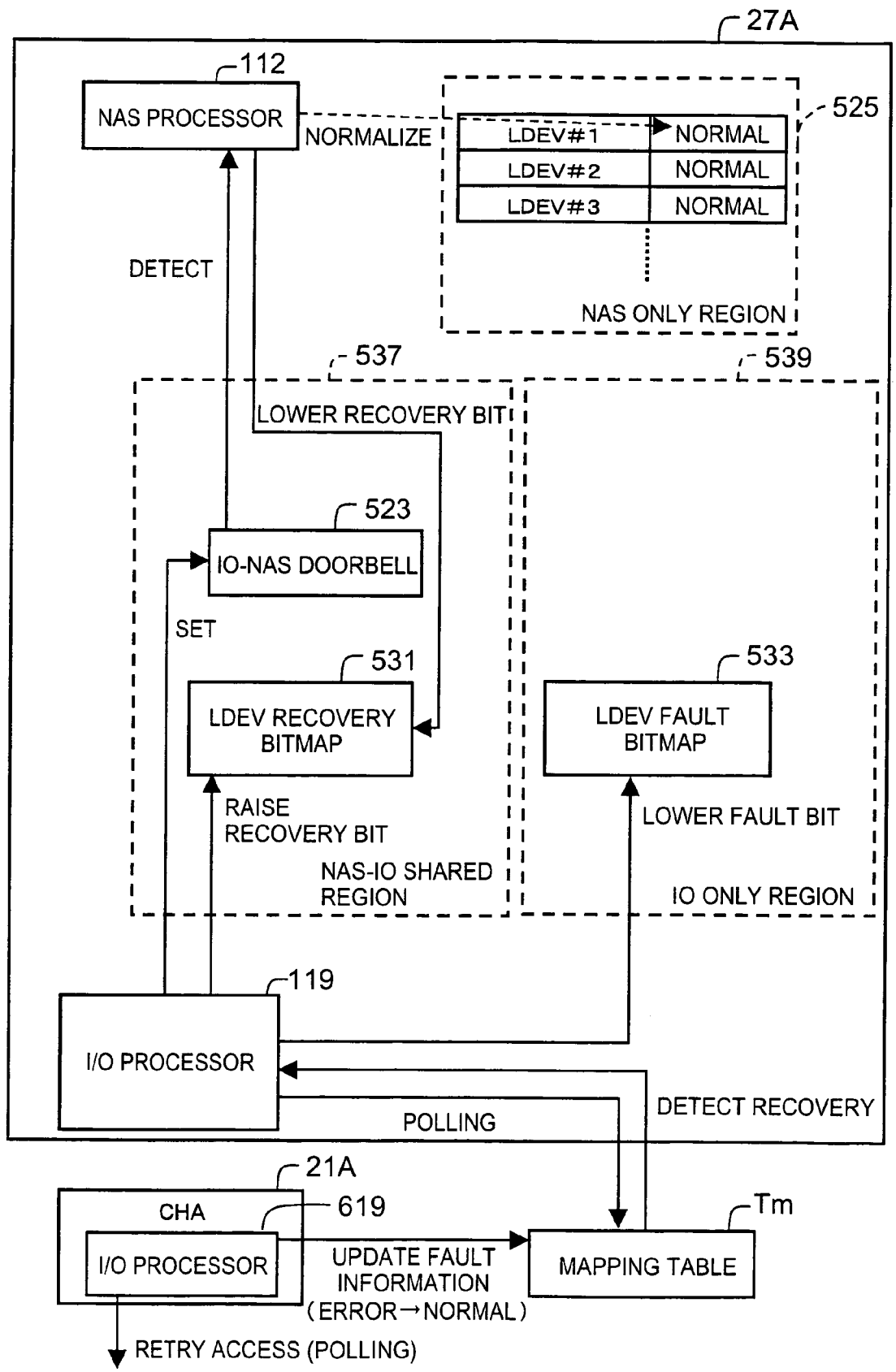
FIG. 15 shows an illustrative diagram of the processing carried out in a case where a fault in the access path to the external LDEV has been recovered.

FIG. 15 shows an illustrative diagram of the processing carried out in a case where a fault in the access path to the external LDEV has been recovered. FIG. 16 shows the processing sequence carried out in a case where a fault has occurred in the access path to the external LDEV. Below, this processing sequence is described with reference to FIG. 15 and FIG. 16.

If a fault which has occurred in the access path to the external LDEV 42 has been recovered (S201), then provided that the I/O processor 619 of the CHA 21A performs access to the external LDEV 42 at regular or irregular intervals (in other words, provided that it performs a polling operation), then it will be able to access the external LDEV 42, when the fault has been recovered. Consequently, the I/O processor 619 is able to recognize that a fault has been recovered (S202). The I/O processor 619 may poll the external LDEV 42 actively, without receiving any external commands, or it may carry out this polling in response to a command from the I/O processor 119.

The I/O processor 619 updates the fault information for the VDEV # corresponding to the LDEV # of the external LDEV 42, from "error" to "normal" (S203).

On the other hand, the I/O processor 119 of the CHN 27A refers to the mapping table Tm (and in particular, the fault information of the VDEV # detected at S105) at regular or irregular intervals (in other words, it performs a polling operation). More specifically, for example, the I/O processor 119 refers to the LDEV fault bitmap 533, identifies an LDEV # for which the fault bit has been raised, and polls the fault information corresponding to the identified LDEV # in the mapping table Tm. The I/O processor 119 may carry out this polling actively, without receiving any external commands, or it may carry out this polling in response to a command from the NAS processor 112. If the I/O processor 119 recognizes that the information has been updated from "error" to "normal" (S204), then it accesses the LDEV recovery bitmap 531 and raises the recovery bit for LDEV #1 corresponding to the VDEV # from which the information has been updated (S205). The I/O processor 119 reports the fact that there is an LDEV that has been recovered, to the NAS processor 112, by setting a doorbell for the NAS processor 112 (hereinafter, called "IO-NAS doorbell") 523 in the NAS-IO shared region 537. It is also possible for the NAS processor 112 to detect the fact that there is a LDEV that has been recovered, by means of polling the LDEV recovery bitmap 531, for instance, rather than using a doorbell 523.

The I/O processor 119 lowers the fault bit corresponding to LDEV #1 (S207), in parallel with the processing in S206.

The NAS processor 112 refers to the LDEV recovery bitmap 531 in response to the report based on the IO-NAS doorbell 523, and it identifies the LDEV # of the LDEV which has been recovered and sets the LDEV 32 having LDEV # 1 thus identified (in other words, the external LDEV 42) to a usable state (for example, it updates the status of the LDEV from "blocked" to "normal" ) (S208). Thereupon, the NAS processor 112 lowers the recovery bit of the LDEV (LDEV #1) which has been set to a usable state (S209).

If the NAS processor 112 has received a file I/O command relating to an LDEV that has been "blocked" from the host device 10, then it returns an error message to the host device 10 (or it does not send any response), and the NAS processor 112 does not carry out processing for converting the file I/O command to a block I/O command and outputting same to the I/O processor 119. However, after an LDEV has changed from "blocked" to "normal", then the NAS processor 112 is able to carry out I/O processing with respect to the LDEV if it receives a file I/O command relating to that LDEV from the host device 10.

According to the first embodiment described above, the NAS processor 112 is able to detect the fact that a fault has occurred, and the fact that the fault has been recovered, for each individual LDEV. In this case, the NAS processor 112 does not need to repeat a retry of access to a particular external LDEV 42, after a fault has been detected in the internal LDEV 32 corresponding to that external LDEV 42. Therefore, it is possible to detect automatically that a fault in an access path to a external LDEV 42 has been recovered, without placing a large burden on the NAS processor 112.

Second Embodiment

Next, a second embodiment of the present invention will be described. The following description will focus on differences with respect to the first embodiment described above, and points which are common with the first embodiment are either omitted or are explained briefly.

The CHN 27A (for example, the current CHN) and the CHN 27B (for example, the standby CHN) form a cluster. The NAS processor 112 of either of the CHNs 27A and 27B performs Blocked handling of an external LDEV 42, if it has not been successful in accessing the external LDEV 42 (in other words, if there is a fault in the access path to the external LDEV 42).

In this second embodiment, at least one of the first NAS processor 112A, which is the NAS processor 112 of the CHN 27A, and the second NAS processor 112B, which is the NAS processor 112 of the CHN 27B, is able to detect that a fault has been recovered, by restarting. Various examples relating to this are described below.

(1) If the first NAS processor 112A is managing an LDEV 31 or 32 which is in a normal state, in addition to an LDEV 32 corresponding to an external LDEV 42 that has a fault.

(1) The first NAS processor 112A is managing an LDEV 31 or 32 which is in a normal state, in addition to an LDEV 32 corresponding to an external LDEV 42 that has a fault.

If the first NAS processor 112A is not able to access a particular external LDEV 42 and detects that there is a fault in the LDEV 32 corresponding to that external LDEV 42, then provided that the file system relating to at least one other LDEV has not been blocked, the first NAS processor 112A is able to carry out the following processing when that fault is subsequently recovered. This processing is described below with reference to FIG. 17.

If a fault has been recovered (S301), then as stated previously, the I/O processor 619 is able to recognize this recovery. In this case, the I/O processor 619 is able to issue a report indicating that a fault has been recovered, to the CHN 27A which has issued a block I/O command but not been able to process it successfully (S302).

The report issued to the CHN 27A can be received by the first NAS processor 112A via the I/O processor 119. In response to this report, the first NAS processor 112A implements a failover of the resources to the second NAS processor 112B (S303), and it stops the resource group (for example, the computer program running on the OS of the NAS processor 112A) (S304).

Thereupon, the first NAS processor 112A restarts (S305) By this processing, the LDEV in which a fault has been recovered can be recognized. In the restart process, the first NAS processor 112A is able to recognize the LDEV # that has been recovered. Upon restarting, the first NAS processor 112A erases the LDEV # which were subject to blocked handling, for example. Furthermore, during restart, the OS is loaded into the NAS processor 112A, but the OS data is read out from the LDEV which stores the control system data (hereinafter, called the system LDEV). The OS data is loaded from the system LDEV via the DKA 22A and the cache memory 24.

After restarting, a resource failback is implemented from the second NAS processor 112B (S306), and the first NAS processor 112A activates the resource group (S307).

The restart in S305 can be performed in response to the aforementioned report from the I/O processor 619, and it can also performed upon receiving a prescribed command from the SVP 23.

In the restart of the first NAS processor 112A, a LDEV recognition process of the following kind is carried out.

Figure 18:
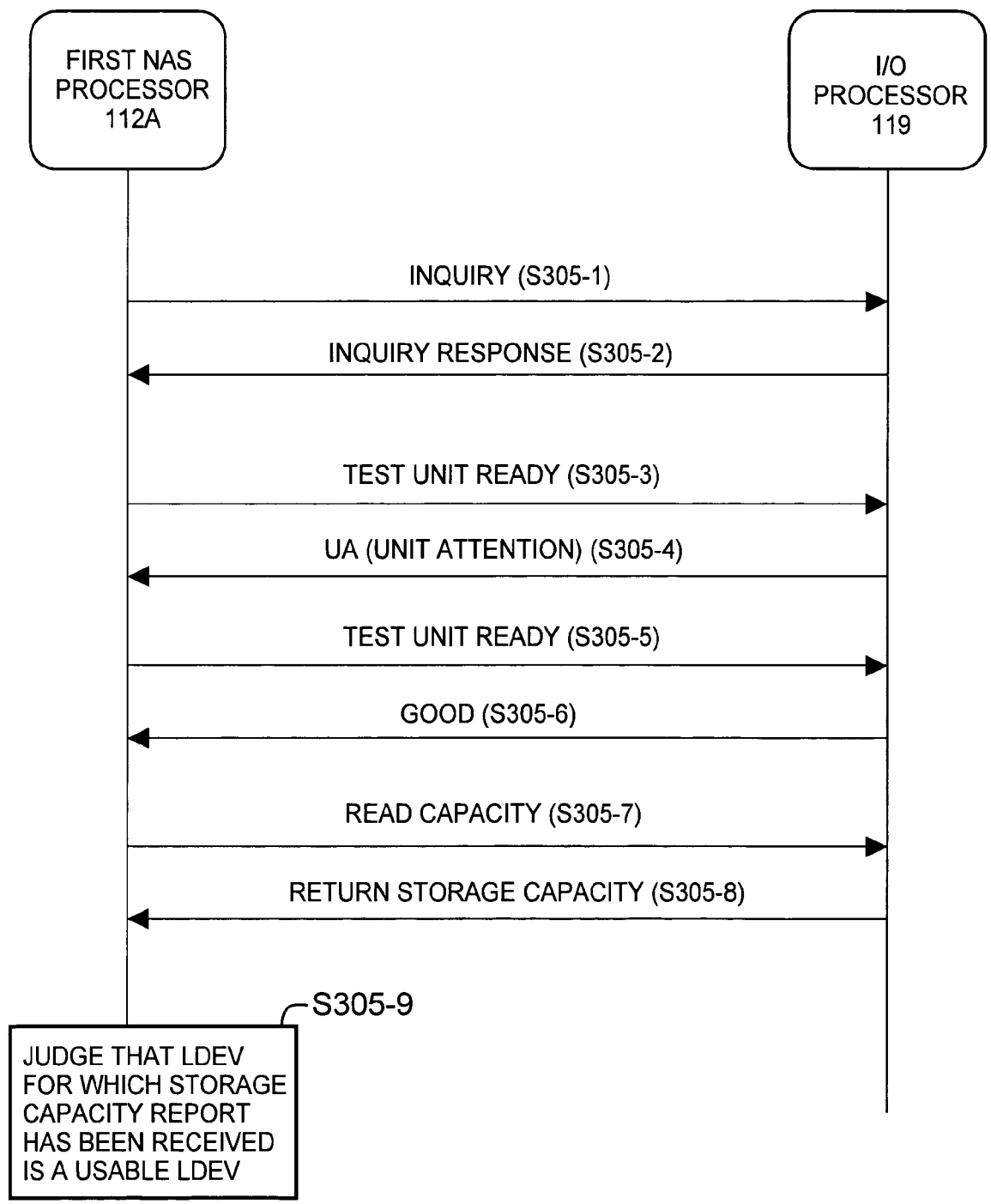
FIG. 18 shows one example of the sequence of LDEV recognition processing carried out during a restart.

FIG. 18 shows the sequence of LDEV recognition processing carried out during restart of the NAS processor 112.

The first NAS processor 112A issues an Inquiry to the I/O processor 119 (S305-1). In response to this, the I/O processor 119 sends information relating to the LDEVs 31 and 32 of the first storage control device 20 (for example, LDEV #), to the first NAS processor 112A (S305-2). The first NAS processor 112A is able to identify the LDEV from this information. At S305-2, the I/O processor 119 obtains various information stored in the shared memory 25, for example, (such as the LDEV # of each LDEV present, and the corresponding VDEV #), and it sends this information to the NAS processor 112A.

The first NAS processor 112A issues a query for each identified LDEV (S305-3). Upon receiving a prescribed response (S305-4), the first NAS processor 112A issues a similar query (S305-5). If it receives a further prescribed response (S305-6), then the first NAS processor 112A inquires about the storage capacity (S305-7). Upon receiving a storage capacity report in response to this query (S305-8), the first NAS processor 112A can judge that it is able to use a LDEV having the reported storage capacity (S305-9).

The further prescribed response (Good) can be issued, for example, when the I/O processor 119 has successfully accessed the external LDEV 42 corresponding to the LDEV 32 for which the query was made, via the CHA 21A.

(2) The first NAS processor 112A is not managing an LDEV 31 or 32 that is in a normal state, in addition to the LDEV 32 corresponding to the external LDEV 42 having a fault, (for example, if all of the LDEVs used by the first NAS processor 112A correspond to external LDEVs having faults in their access paths, and all of these LDEVs are) blocked (i.e., to set as non-accessible LDEVs).

One example of a processing sequence carried out in this case is shown in FIG. 19.

In this case, a failover is implemented from the first NAS processor 112A to the second NAS processor 112B (S401). Information indicating which of the file systems has been set to blocked status can be stored in a memory in the NAS processor 112A, for example.

Thereafter, if processing similar to that in S301 and S302 in FIG. 17 is carried out (S402 and S403), then the first NAS processor 112A compulsorily stops the resource group (S404), and then restarts it (S405). Subsequently, similar processing to that in S306 and S307 shown in FIG. 17 is implemented (S406 and S407).

(3) The first NAS processor 112A is not managing an LDEV 31 or 32 that is in a normal state, in addition to the LDEV 32 corresponding to the external LDEV 42 having a fault (for example, if all of the LDEVs used by the NAS processors 112A and 112B correspond to external LDEVs having faults in their access paths, and all of these LDEVs are set to blocked status).

One example of a processing sequence carried out in this case is shown in FIG. 20.

In this case, processing similar to S401 in FIG. 18 (S501A) is also carried out in the second NAS processor 112B as well (S501B).

Thereupon, if processing similar to that in S301 and S302 in FIG. 17 is carried out (S502 and S503), then the resource groups are compulsorily stopped by both of the NAS processors 112A and 112B (S504A and S504B), and the cluster 27 is stopped (S505).

Thereupon, both of the NAS processors 112A and 112B are restarted respectively (S506A and S506B), and the cluster 27 is started up (S507). The NAS processors 112A and 112B respectively start up the resource groups (S508A and S508B).

Preferred embodiments of the present invention were described above, but these are examples for the purpose of describing the present invention, and the scope of the present invention is not limited to these embodiments alone. The present invention may be implemented in various further modes. For example, the cache memory 24 and the shared memory 25 do not need to be physically separate memories and they may be logically separated within the same memory. Furthermore, instead of the LDEV recovery bitmap 533, it is also possible to adopt a system in which information having respective statuses corresponding to the LDEVs is prepared and these statuses (for example, normal, fault, recovery) are updated suitably. Moreover, for example, in the CHN 27A, at least one of the communications memory 802 and the hardware register group 803 may be omitted, and one or a plurality of further storage regions may be provided in its stead. Furthermore, for example, if a fault has occurred in the access path, then this may also be reported to the CHN 27A in such a manner that the location at which this fault has occurred can be identified, (for example, a monitoring program which monitors whether or not a fault has occurred at a prescribed location may output information indicating the location at which a fault has occurred, if a fault has occurred.) Furthermore, for example, if there is a fault, then the CHN 27A may be able to display fault related information on the display screen of the host device 10, SVP 23 or management terminal 15, indicating, for example, which LDEV cannot be accessed as a result of the fault, and what type of fault has occurred (for example, a port fault, a power supply fault, a path fault, a switch fault, an external LDEV fault, or the like).

What is claimed is:

1. An access control device comprising:
   a first interface for receiving an access request from a host device issuing said access request;
   a second interface for respectively accessing one or a plurality of access destination candidates in an external device provided with said one or a plurality of access destination candidates via a network,
   wherein said second interface:
   attempts, when said first interface has received an access request, access to a particular access destination candidate in the external device corresponding to the received access request via said network, of said one or a plurality of access destination candidates;
   judges that a fault has occurred and outputs a judgment result indicating a fault, if said access attempt fails; and
   outputs a judgment result indicating a recovery if it is judged that there has been a recovery after the access attempt has failed, and wherein said first interface determines that there has been a recovery in the access oath to said particular access destination candidate by referring to the judgment result output by the second interface,
wherein the first interface comprises:
a first processor which receives said access request from said host device and outputs another access request based on said received access request; and
a second processor which receives the other access request output by said first processor, and outputs yet another access request in order to request said second interface to access said particular access destination candidate of said one or a plurality of access destination candidates in the external device, based on said received other access request,
wherein said second processor refers to said judgment result and outputs a reference result indicating whether there is a fault or a recovery,
wherein said first interface has a second storage region which stores recovery existence data indicating the existence or absence of a recovery in the access path to each of said one or a plurality of access destination candidates,
wherein said second processor sets the existence of a recovery in said recovery existence data relating to said particular access destination candidate having a recovery,
wherein said first processor determines the existence of a recovery and recognizes said particular access destination candidate corresponding to the existence of a recovery, by referring to said recovery existence data,
wherein said second processor sets a second interrupt relating to said first processor, when it has determined that there has been a recovery from said judgment result, and
wherein said first processor detects said second interrupt and refers to said recovery existence data in response thereto.

2. The access control device according to claim 1, further comprising:
a shared storage region which can be referred to by said first interface and said second interface,
wherein said shared storage region stores one or a plurality of status data corresponding respectively to said one or a plurality of access destination candidates,
wherein said second interface updates the status data corresponding to said particular access destination candidate to a status indicating that there is a fault, if it has been judged that there has been a fault, and updates said status data to a status indicating that there is no fault or that there has been a recovery corresponding to said particular access destination candidate, if it has been judged that there has been a recovery, and
wherein said first interface determines that there has been a recovery in the access path to said particular access candidate by referring to said shared storage region at regular or irregular intervals.

3. The access control device according to claim 1,
wherein said first interface has a first storage region which stores fault existence data indicating the existence or absence of a fault in the access path to each of said one or a plurality of access destination candidates, and
wherein said second processor sets the existence of a fault in said fault existence data relating to said particular access destination candidate having a fault, and determines the existence of a fault and recognizes said particular access destination candidate corresponding to the existence of the fault, by referring to said fault existence data.

4. The access control device according to claim 1,
wherein said first processor sets a first interrupt relating to said second processor, when it has determined that there has been a fault in the access path to said particular access destination candidate based on the reference result output by said second processor, and
wherein said second processor detects said first interrupt and sets said existence of a fault in said fault existence data in response thereto.

5. An access control device comprising:
a first interface for receiving an access request from a host device issuing said access request;
a second interface for respectively accessing one or a plurality of access destination candidates in an external device provided with said one or a plurality of access destination candidates via a network,
wherein said second interface:
attempts, when said first interface has received an access request, access to a particular access destination candidate in the external device corresponding to the received access request via said network, of said one or a plurality of access destination candidates;
judges that a fault has occurred and outputs a judgment result indicating a fault, if said access attempt fails; and
outputs a judgment result indicating a recovery if it is judged that there has been a recovery after the access attempt has failed,
wherein said first interface determines that there has been a recovery in the access path to said particular access destination candidate by referring to the judgment result output by the second interface,
wherein the first interface comprises:
a first processor which receives said access request from said host device and outputs another access request based on said received access request;
a second processor which receives the other access request output by said first processor, and outputs yet another access request in order to request said second interface to access said particular access destination candidate of said one or a plurality of access destination candidates in the external device, based on said received other access request,
wherein said second processor refers to said judgment result and outputs a reference result indicating whether there is a fault or a recovery;
a first storage region which stores fault existence data indicating the existence or absence of a fault in the access path to each of said one or a plurality of access destination candidates; and
a second storage region which stores recovery existence data indicating the existence or absence of a recovery in the access path to each of said one or a plurality of access destination candidates,
wherein said first processor sets a first interrupt relating to said second processor, when it has determined that there has been a fault in the access path to said particular access destination candidate on the basis of the reference result output by said second processor,
wherein said second processor detects said first interrupt and in response thereto, sets the existence of a fault in said fault existence data relating to said particular access destination candidate having a fault,
wherein said second processor sets the existence of a recovery in said recovery existence data relating to said particular access destination candidate having a recovery, if it has determined that there has been a recovery from said judgment result, sets a second interrupt relating to said first processor, and changes said existence of a fault in said fault existence data to an absence of a fault, and wherein said first processor detects said second interrupt and in response thereto, determines the existence of a recovery by referring to said recovery existence data, recognizes said particular access destination candidate corresponding to the existence of a recovery, and changes the existence of a recovery thus determined to an absence of a recovery.

6. The access control device according to claim 5, wherein a cluster is formed by one first interface and another first interface, wherein if it has been detected that there is a fault in the access path to said particular access destination candidate, one first processor provided in said one first interface sets said particular access destination candidate to blocked status, stores identification information for the particular access destination candidate that has been set to blocked status, implements a failover to another first processor provided in said other first interface, wherein blocked status indicates that access to said particular access destination candidate is blocked, wherein upon recovery of said one first interface, said one first interface is restarted, and wherein upon said restart of said one first interface, said one first processor provided in said one first interface erases said identification information for the access destination candidate that has been set to blocked status, and recognizes a usable access destination candidate by receiving information relating to said one or a plurality of access destination candidates, from the second processor.

7. The access control device according to claim 5, wherein said first processor receives a file-level access request from said host device, and converts said received file-level access request to a block-level access request and outputs said block-level request, and wherein said second processor generates and outputs said other access request based on the block-level access request output from said first processor.

8. The access control device according to claim 5, further comprising:

at least one or more logical units which are accessed by said host device; and at least one or more intermediate storage layers provided so as to connect said logical units to at least one or more storage devices, wherein said one or a plurality of access destination candidates are respectively storage devices, and wherein at least one of said intermediate storage layers is connected to a storage device of said external device.

9. The access control device according to claim 5, wherein said intermediate storage layers comprise:

at least one or more first storage layers established on said storage device of said external device; and at least one or more second storage layers established on said at least one or more first storage layers, and a storage device of said external device is mapped to said at least one or more first storage layers.

10. A first interface in an access control device, said access control device comprising said first interface and a second interface, said first interface for receiving an access request from a host device issuing said access request, and said second interface for respectively accessing one or a plurality of access destination candidates in an external device provided with said one or a plurality of access destination candidates, said first interface comprising:

a first processor which receives said access request from said host device and outputs another access request based on said received access request:

a second processor which receives the other access request output by said first processor, and outputs yet another access request in order to request said second interface to access a particular access destination candidate of said one or a plurality of access destination candidates, on the basis of said received other access request;

a first storage region which stores fault existence data indicating the existence or absence of a fault in the access oath to each of said one or a plurality of access destination candidates; and a second storage region which stores recovery existence data indicating the existence or absence of a recovery in the access path to each of said one or a plurality of access destination candidates, wherein, if there is a fault in the access path from said second interface to said particular access destination candidate, said second processor sets the existence of a fault in said fault existence data for said particular access destination candidate having a fault, and when there has subsequently been a recovery, sets the existence of a recovery in said recovery existence data relating to said particular access destination candidate having a recovery, and changes said existence of a fault in said fault existence data to the absence of a fault, wherein said first processor determines the existence of a recovery and recognizes said particular access destination candidate corresponding to the existence of a recovery, by referring to said recovery existence data; and changes said determined existence of a recovery to the absence of a recovery, wherein said first processor sets a first interrupt relating to said second processor, when it has determined that there has been a fault in the access path to said particular access destination candidate, wherein said second processor detects said first interrupt and in response thereto, sets the existence of a fault in said fault existence data relating to said particular access destination candidate having a fault, wherein said second processor sets a second interrupt relating to said first processor, when it has determined that there has been a recovery, and wherein said first processor detects said second interrupt and refers to said recovery existence data in response thereto.

* * * * *